(12) United States Patent
Nitta et al.

(10) Patent No.: US 8,548,682 B2
(45) Date of Patent: Oct. 1, 2013

(54) LATERAL MOTION CONTROL APPARATUS FOR A VEHICLE

(75) Inventors: Hirofumi Nitta, Obu (JP); Yuichi Mizutani, Aichi-ken (JP); Mitsuhiro Tokimasa, Obu (JP); Junpei Tatsukawa, Chiryu (JP); Yasuhiko Mukai, Anjo (JP); Yoshihisa Ogata, Chiryu (JP); Hajime Kumabe, Kariya (JP); Masatoshi Hanzawa, Kariya (JP); Masaki Maruyama, Nagoya (JP)

(73) Assignees: Aisin Seiki Kabushiki Kaisha, Kariya-Shi, Aichi-Ken (JP); Denso Corporation, Kariya, Aichi-Pref. (JP); Advics Co., Ltd., Kariya, Aichi-Pref (JP)

( * ) Notice: Subject to any disclaimer, the term of this patent is extended or adjusted under 35 U.S.C. 154(b) by 48 days.

(21) Appl. No.: 13/282,738

(22) Filed: Oct. 27, 2011

(65) Prior Publication Data

US 2012/0109461 A1 May 3, 2012

(30) Foreign Application Priority Data

Oct. 29, 2010 (JP) ................................. 2010-243408

(51) Int. Cl.
*G05D 1/00* (2006.01)
(52) U.S. Cl.
USPC .............................................. 701/41; 703/2
(58) Field of Classification Search
USPC ............................ 701/1, 41; 180/168; 703/2
See application file for complete search history.

(56) References Cited

U.S. PATENT DOCUMENTS

| 6,053,270 A * | 4/2000 | Nishikawa et al. ........... 180/168 |
| 7,143,864 B2 * | 12/2006 | Mattson et al. ............... 180/446 |
| 7,739,014 B2 * | 6/2010 | Lu et al. .......................... 701/48 |
| 8,321,088 B2 * | 11/2012 | Brown et al. .................... 701/38 |
| 8,359,155 B2 * | 1/2013 | Kimura et al. ................ 701/302 |
| 2012/0109415 A1 * | 5/2012 | Nitta et al. ......................... 701/1 |
| 2012/0179349 A1 * | 7/2012 | Yamakado et al. ............. 701/89 |

FOREIGN PATENT DOCUMENTS

JP 2003-081115 A 3/2003

\* cited by examiner

*Primary Examiner* — Russell Frejd
(74) *Attorney, Agent, or Firm* — Buchanan Ingersoll & Rooney PC

(57) ABSTRACT

A lateral motion control apparatus includes a target value obtaining unit, a control amount calculation unit, a steering intent determination unit that determines whether a driver of the vehicle is steering with intent, and a control object control unit that controls the control object so as to control the control object based on the control amount when the driver is not steering with intent, and to stop the control of the control object when the driver is steering with intent. The steering intent determination unit includes a steering operation amount obtaining unit and a threshold value setting unit that sets a threshold value for the steering operation amount based on the target value, and determines whether or not the driver is steering with intent by comparing the magnitude of the steering operation amount with the threshold value.

10 Claims, 19 Drawing Sheets

LATERAL MOTION CONTROL APPARATUS FOR A VEHICLE

TECHNICAL FIELD

The disclosure relates to lateral motion control apparatuses that control the lateral motion, such as the yaw rate, of vehicles.

BACKGROUND DISCUSSION

In recent years, driving assistance apparatuses (called "driving assistance applications" hereinafter) that assist in the driving of a moving vehicle are being developed. For example, lane keep apparatuses that automatically steer or assist in driving so that vehicles travel along a road, lane departure prevention apparatuses that assist in driving by preventing vehicles from departing from their lanes, emergency avoidance apparatuses that automatically steer vehicles in order to avoid obstructions on the traveled road surface, and so on are being developed.

Request signals outputted from a driving assistance application such as a lane keep apparatus, a lane departure prevention apparatus, or an emergency avoidance apparatus (for example, a signal indicating a target lateral acceleration) are inputted into a lateral motion control apparatus that controls the amount of lateral motion (for example, the yaw rate) of the vehicle. Control signals are outputted from a control apparatus to an actuator, and the actuator operates based on the control signals, thus controlling the lateral motion of the vehicle.

In the case where a driver has performed steering operations while the lateral motion of the vehicle is being controlled based on a request signal outputted from a driving assistance application (such interventional steering performed by the driver will be called "overriding"), the lateral motion control is usually stopped in order to give priority to the steering operations performed by the driver. However, although the lateral motion control should be stopped in the case where a driver has performed a steering operation based on his or her own intent to perform the steering operation (intentional steering) during lateral motion control, the lateral motion control should not be stopped when the driver is steering without intent. Accordingly, in the case where the driver has performed a steering operation during lateral motion control, it should be determined whether or not that steering operation is based on the driver's own intent to perform the steering operation, and the lateral motion control should then be stopped based on the result of that determination. However, it is difficult to determine whether or not a driver intends to perform steering operation.

JP2003-81115A discloses a lane departure prevention apparatus that determines that an override is occurring in the case where a steering angle $\theta$ is greater than or equal to a set steering angle $\theta 1$ after a set time T1 has passed after a steering angle velocity absolute value $|d\theta|$ becoming greater than or equal to a set threshold value $d\theta 1$. According to this apparatus, it is determined that an override is not occurring if the steering angle $\theta$ is less than the set steering angle $\theta 1$ after T1 has passed even if the steering angle velocity absolute value $|d\theta|$ is greater than or equal to the threshold value $d\theta 1$, which prevents the control of the lateral motion amount of the vehicle from being stopped when the steering angle velocity has temporarily exceeded the set threshold value due to the influence of disturbances or the like. Furthermore, JP2003-81115A also discloses a lane departure response apparatus that changes the set threshold value used in the determination as to whether or not an override is occurring based on the position of the vehicle in a lane, the curvature factor during a turn, and so on.

SUMMARY

In the case where a target value inputted into the lateral motion control apparatus from the driving assistance application has changed, a steering operation amount (for example, steering torque) from the driver is temporarily inputted due to that change. It is determined that an override has occurred when the steering operation amount temporarily inputted has exceeded a threshold value, and the lateral motion control is stopped as a result. The steering operation amount inputted due to the change of the target value from the driving assistance application is not a steering operation amount inputted due to the traveling environment, as indicated in the aforementioned JP2003-81115A. Accordingly, the steering operation amount inputted due to the change of the target value from the driving assistance application is not a steering operation amount inputted based on intentional steering by the driver, and thus it is desirable not to stop but rather to continue the lateral motion control. In this case, it is preferable to be able to accurately determine whether or not the inputted steering operation amount was inputted based on the intentional steering.

Thus, a need exists for a lateral motion control apparatus which is not susceptible to the drawback mentioned above.

According to the aspect of this disclosure, a lateral motion control apparatus for a vehicle (40) includes a target value obtaining unit (411) that obtains a target value ($\gamma^*$ or $Gy^*$) for a lateral motion amount of a vehicle, a control amount calculation unit (414, 415, 416) that calculates a control amount for a control object (14, 22, 32) controlled so as to change the lateral motion amount of the vehicle based on the target value of the lateral motion amount obtained by the target value obtaining unit, a steering intent determination unit (417) that determines whether or not a driver of the vehicle is steering with intent, and a control object control unit (42, 43, 44) that controls the control object so as to control the control object based on the control amount when the steering intent determination unit has not determined that the driver is steering with intent, and to stop the control of the control object when the steering intent determination unit has determined that the driver is steering with intent. The steering intent determination unit includes a steering operation amount obtaining unit (S20, S80) that obtains the steering operation amount inputted by the driver of the vehicle, and a threshold value setting unit (417a) that sets a threshold value for the steering operation amount based on the target value. Then, the steering intent determination unit determines whether or not the driver is steering with intent by comparing the magnitude of the steering operation amount inputted by the driver of the vehicle with the threshold value set by the threshold value setting unit.

BRIEF DESCRIPTION OF THE DRAWINGS

The foregoing and additional features and characteristic of this disclosure will become more apparent from the following detailed description considered with the reference to the accompanying drawings, wherein.

DETAILED DESCRIPTION (First Embodiment)

Figure 1:
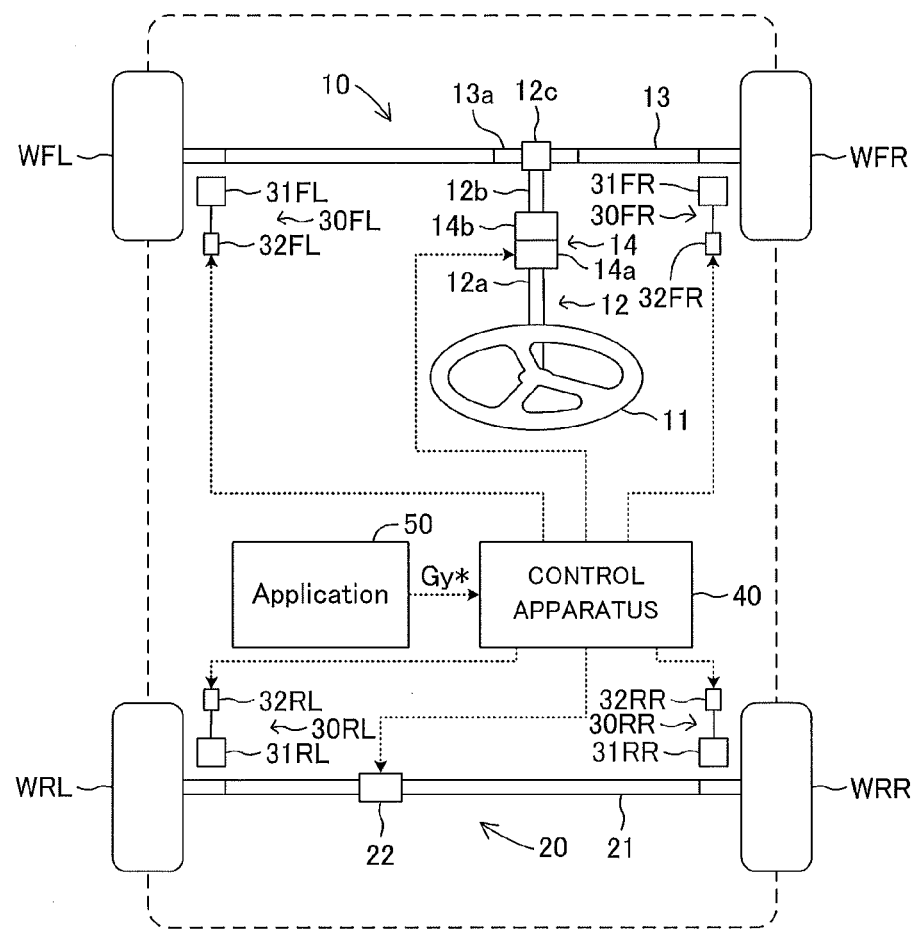
FIG. 1 is a schematic diagram illustrating a vehicle in which a lateral motion control apparatus according to an embodiment is installed.

Hereinafter, a first embodiment disclosed here will be described with reference to the drawings. FIG. 1 is a schematic diagram illustrating a vehicle in which a lateral motion control apparatus according to the present embodiment is installed. As shown in FIG. 1, this vehicle includes a front steering apparatus 10, a rear steering apparatus 20, and braking apparatuses (a right-front wheel braking apparatus 30FR, a left-front wheel braking apparatus 30FL, a right-rear wheel braking apparatus 30RR, and a left-rear wheel braking apparatus 30RL). The front steering apparatus 10 applies a steering force to a left-front wheel WFL and a right-front wheel WFR, thus steering (turning) those wheels. The rear steering apparatus 20 applies a steering force to a left-rear wheel WRL and a right-rear wheel WRR, thus steering (turning) those wheels. The right-front wheel braking apparatus 30FR applies a braking force on the right-front wheel WFR. The left-front wheel braking apparatus 30FL applies a braking force on the left-front wheel WFL. The right-rear wheel braking apparatus 30RR applies a braking force on the right-rear wheel WRR. The left-rear wheel braking apparatus 30RL applies a braking force on the left-rear wheel WRL.

The front steering apparatus 10 includes a steering wheel 11, a steering shaft 12, a front-wheel steering rack 13, and a front steering actuator 14. The steering shaft 12 has an input-side steering shaft 12a and an output-side steering shaft 12b.

The input-side steering shaft 12a is connected at one end (the upper end) to the steering wheel 11, and rotates axially in response to an operation that rotates the steering wheel 11. In addition, the input-side steering shaft 12a is linked at its other end (the lower end) to one end of the output-side steering shaft 12b via the front steering actuator 14. Accordingly, the rotational force of the input-side steering shaft 12a is transmitted to the output-side steering shaft 12b via the front steering actuator 14. A pinion gear 12c is formed in the other end (the lower end) of the output-side steering shaft 12b. Furthermore, a rack gear 13a that engages with the pinion gear 12c is formed in the front-wheel steering rack 13. A rack and pinion mechanism is thus configured by the pinion gear 12c and the rack gear 13a. This rack and pinion mechanism converts the rotational force of the output-side steering shaft 12b into linear force of the front-wheel steering rack 13. Accordingly, when the driver rotates the steering wheel 11, the front-wheel steering rack 13 moves in the linear direction. The ends of the front-wheel steering rack 13 are connected to the left-front wheel WFL and the right-front wheel WFR, respectively, via tie rods. Therefore, the front wheels are steered when the driver rotates the steering wheel 11 and the front-wheel steering rack 13 moves in the linear direction.

Meanwhile, the front steering actuator 14 includes a first actuator 14a and a second actuator 14b. The first actuator 14a is configured of, for example, an electric motor. The first actuator 14a is attached to the input-side steering shaft 12a via, for example, a gear mechanism. The input-side steering shaft 12a is rotated as a result of the first actuator 14a rotating. Therefore, the front wheels can be steered (turned) automatically by driving the first actuator 14a even if the driver is not rotating the steering wheel 11. The first actuator 14a can also generate an assistance force for aiding the driver in rotating the steering wheel.

The second actuator 14b can be configured of, for example, a reducer and an electric motor. In this case, the casing of the electric motor is linked to the one end (the lower end) of the input-side steering shaft 12a, and a rotor of the electric motor is linked to the output-side steering shaft 12b via the reducer. Accordingly, when the input-side steering shaft 12a rotates, that rotational force is transmitted to the output-side steering shaft 12b via the second actuator 14b. Furthermore, when the second actuator 14b rotates, the output-side steering shaft 12b is rotated and the front wheels are automatically steered without the input-side steering shaft 12a rotating.

The rear steering apparatus 20 includes a rear-wheel steering rack 21 and a rear steering actuator 22. The rear-wheel steering rack 21 is connected to the left-rear wheel WRL and the right-rear wheel WRR. The rear steering actuator 22 is attached to the rear-wheel steering rack 21. The rear steering actuator 22 is configured of, for example, an electric motor and a ball screw mechanism. The ball screw mechanism has a ball screw nut and a ball screw rod. The ball screw rod forms part of the rear-wheel steering rack 21. The ball screw nut is linked to the rotor of the electric motor so as to be capable of rotating integrally therewith. When the ball screw nut rotates due to the rotation of the electric motor, that rotational force is converted by the ball screw mechanism into linear force of the rear-wheel steering rack 21. Therefore, the rear-wheel steering rack 21 moves in the linear direction due to the driving of the rear steering actuator 22, thus the rear wheels are automatically steered (turned).

The braking apparatuses 30FR, 30FL, 30RR, and 30RL include braking mechanisms 31FR, 31FL, 31RR, and 31RL, respectively, for applying braking forces for the respective wheels WFR, WFL, WRR, and WRL. The braking mechanisms 31FR, 31FL, 31RR, and 31RL operate in response to the driver depressing a brake pedal. The braking mechanisms 31 FR, 31 FL, 31 RR, and 31 RL can be configured of, for example, disc rotors that rotate coaxially with the wheels WFR, WFL, WRR, and WRL, brake pads disposed so as to be capable of making contact with the disc rotors, pistons that apply a compressive force to the brake pads, hydraulic circuits that transmit, to the pistons, the depressive force applied to the brake pedal boosted by a brake booster (not shown), and so on.

DYC (Dynamic Yaw Control) actuators 32FR, 32FL, 32RR, and 32RL are attached to the braking mechanisms 31FR, 31FL, 31RR, and 31RL. The DYC actuators are actuators that can apply a braking force or a driving force to the individual wheels. In the present embodiment, the DYC actuators are brake actuators that can apply a braking force to the individual wheels. The braking mechanisms 31FR, 31FL, 31RR, and 31RL are operated due to the operation of the DYC actuators 32FR, 32FL, 32RR, and 32RL, thus applying braking forces to the wheels WFR, WFL, WRR, and WRL independently. The DYC actuators 32FR, 32FL, 32RR, and 32RL operate independently from the depression of the brake pedal when control signals are issued from a lateral motion control apparatus, which will be discussed later. Braking forces are applied automatically to the wheels WFR, WFL, WRR, and WRL as a result. The DYC actuators 32FR, 32FL, 32RR, and 32RL can be configured of, for example, pressure pumps, pressurizing valves and depressurizing valves interposed within the aforementioned hydraulic circuit, or the like. Hereinafter, when referring collectively to the DYC actuators 32FR, 32FL, 32RR, and 32RL, or when specifying a single or multiple DYC actuators 32FR, 32FL, 32RR, and 32RL, the term "DYC actuator 32" will be used.

Although in this embodiment, the DYC actuator 32 is an actuator for applying a braking force to individual wheels, it should be noted that the DYC actuator 32 may be an actuator for applying a driving force or a regenerative braking force to the individual wheels. For example, if the vehicle is provided with in-wheel type motors, the in-wheel type motors may be DYC actuators.

The front steering actuator 14, the rear steering actuator 22, and the DYC actuator 32 are electrically connected to a lateral motion control apparatus 40, respectively. The lateral motion control apparatus 40 is configured of a microcomputer including a ROM, a RAM, and a CPU, and outputs operation signals to the respective actuators, thus carrying out integrated control of the lateral motion of the vehicle.

In addition, the vehicle is provided with a driving assistance application 50. The driving assistance application 50 calculates a lateral acceleration (target lateral acceleration) Gy* required by the present traveling vehicle for traveling along its lane. The target lateral acceleration Gy* calculated by the driving assistance application 50 is inputted into the lateral motion control apparatus 40. The lateral motion control apparatus 40 outputs operation signals to the respective actuators 14, 22, and 32 based on the inputted target lateral acceleration Gy*.

Figure 2:
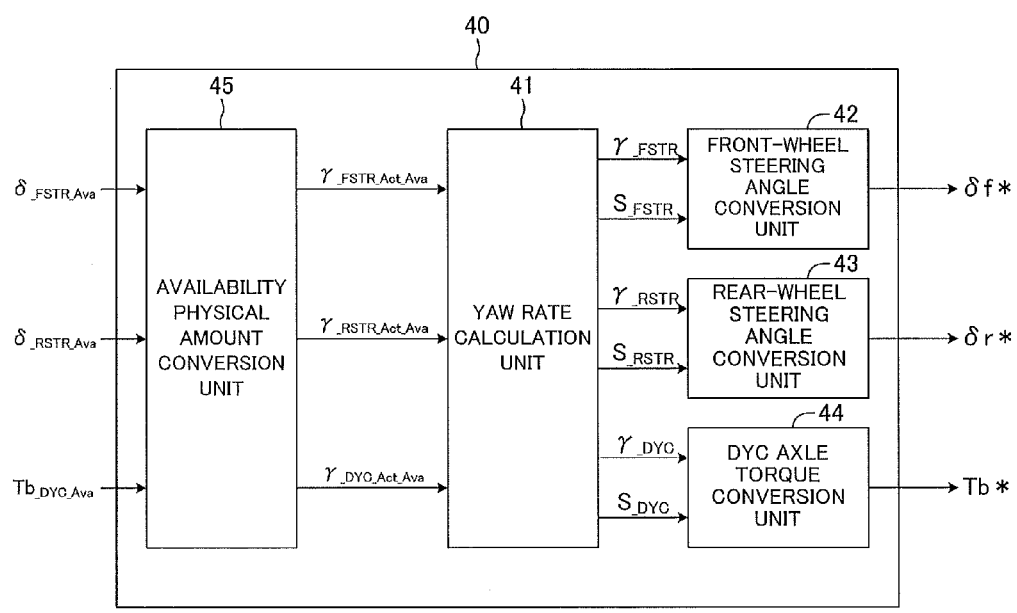
FIG. 2 is a diagram illustrating the functional configuration of a lateral motion control apparatus.

FIG. 2 is a diagram illustrating the functional configuration of the lateral motion control apparatus 40. The lateral motion control apparatus 40 according to the present embodiment controls the yaw rate of the vehicle. As shown in FIG. 2, the lateral motion control apparatus 40 includes an availability physical amount conversion unit 45, a yaw rate calculation unit 41, a front-wheel steering angle conversion unit 42, a rear-wheel steering conversion unit 43, and a DYC axle torque conversion unit 44.

The availability physical amount conversion unit 45 takes, as its inputs, a front steering availability steering angle $\delta\_{FSTR\_Ava}$, a rear steering availability steering angle $\delta\_{RSTR\_Ava}$, and a DYC availability torque $Tb\_{DYC\_Ava}$. The front steering availability steering angle $\delta\_{FSTR\_Ava}$ indicates a steering (turning) angular amount by which the front wheels can be steered (turned) from a current steering (turning) state by operation (actuation) of the front steering actuator 14. The rear steering availability steering angle $\delta\_{RSTR\_Ava}$ indicates a steering (turning) angular amount by which the rear wheels can be steered (turned) from a current steering (turning) state by operation (actuation) of the rear steering actuator 22. The DYC availability torque $Tb_{\_DYC\_Ava}$ indicates an axle torque amount that can be applied to an axle controlled by operation (actuation) of the DYC actuator 32.

The front steering availability steering angle $\delta_{\_FSTR\_Ava}$ can be found based on the current steering (turning) angle of the front wheels and the maximum steering (turning) angle of the front wheels. The rear steering availability steering angle $\delta_{\_RSTR\_Ava}$ can be found based on the current steering (turning) angle of the rear wheels and the maximum steering (turning) angle of the rear wheels. The DYC availability torque $Tb_{\_DYC\_Ava}$ can be found based on an axle torque currently acting on an axle and the maximum value of the axle torque that can act on that axle.

In addition, the availability physical amount conversion unit 45 calculates a front steering availability theoretical yaw rate $\gamma_{\_FSTR\_Act\_Ava}$, a rear steering availability theoretical yaw rate $\gamma_{\_RSTR\_Act\_Ava}$, and a DYC availability theoretical yaw rate $\gamma_{\_DYC\_Act\_Ava}$ based on the inputted front steering availability steering angle $\delta_{\_FSTR\_Ava}$, rear steering availability steering angle $\delta_{\_RSTR\_Ava}$, and DYC availability torque $Tb_{\_DYC\_Ava}$. The availability theoretical yaw rates calculated by the availability physical amount conversion unit 45 are outputted to the yaw rate calculation unit 41. The front steering availability theoretical yaw rate $\gamma_{\_FSTR\_Act\_Ava}$ indicates a maximum value (or range) for the yaw rate that can theoretically be elicited when the steering angle of the front wheels changes within a range represented by the front steering availability steering angle $\delta_{\_FSTR\_Ava}$. The rear steering availability theoretical yaw rate $\gamma_{\_RSTR\_Act\_Ava}$ indicates a maximum value (or range) for the yaw rate that can theoretically be elicited when the steering angle of the rear wheels changes within a range represented by the rear steering availability steering angle $\delta_{\_RSTR\_Ava}$. The DYC availability theoretical yaw rate $\gamma_{\_DYC\_Act\_Ava}$ indicates a maximum value (or range) for the yaw rate that can theoretically be elicited when the axle torque changes within a range represented by the DYC availability torque $Tb_{\_DYC\_Ava}$.

The yaw rate calculation unit 41 calculates a front steering yaw rate control amount $\gamma_{\_FSTR}$ (where FSTR indicates the front steering actuator 14), a rear steering yaw rate control amount $\gamma_{\_RSTR}$ (where RSTR indicates the rear steering actuator 22), and a DYC yaw rate control amount $\gamma_{\_DYC}$ (where DYC indicates the DYC actuator 32), based on the target lateral acceleration Gy* inputted from the driving assistance application 50, and outputs these yaw rate control amounts. The front steering yaw rate control amount $\gamma_{\_FSTR}$ is a target control amount for the yaw rate elicited in the vehicle when the front steering actuator 14 operates and steers the front wheels. The rear steering yaw rate control amount $\gamma_{\_RSTR}$ is a target control amount for the yaw rate elicited in the vehicle when the rear steering actuator 22 operates and steers the rear wheels. The DYC yaw rate control amount $\gamma_{\_DYC}$ is a target control amount for the yaw rate elicited in the vehicle when the DYC actuator 32 operates and applies a braking force to one of the wheels, and in particular, to one of the right-rear wheel WRR and left-rear wheel WRL.

The yaw rate calculation unit 41 outputs a front steering actuation request signal $S_{\_FSTR}$, a rear steering actuation request signal $S_{\_RSTR}$, and a DYC actuation request signal $S_{\_DYC}$. The front steering actuation request signal $S_{\_FSTR}$ is a signal for requesting the front steering actuator 14 to operate for yaw rate control. The rear steering actuation request signal $S_{\_RSTR}$ is a signal for requesting the rear steering actuator 22 to operate for yaw rate control. The DYC actuation request signal $S_{\_DYC}$ is a signal for requesting the DYC actuator 32 to operate for yaw rate control.

Figure 3:
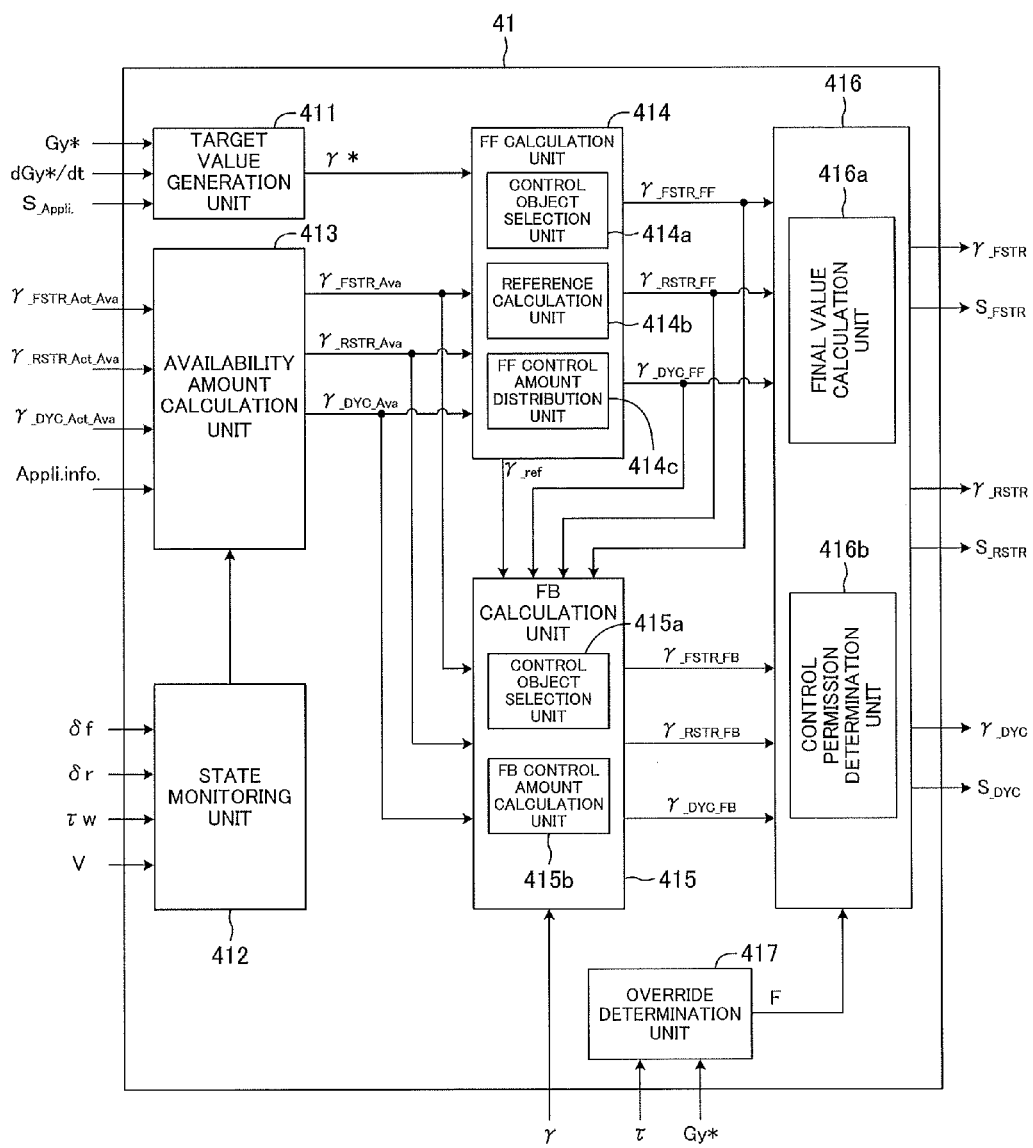
FIG. 3 is a diagram illustrating the functional configuration of a yaw rate calculation unit.

FIG. 3 is a diagram illustrating the functional configuration of the yaw rate calculation unit 41. As shown in FIG. 3, the yaw rate calculation unit 41 includes a target value generation unit 411, a state monitoring unit 412, an availability amount calculation unit 413, a feed-forward (FF) calculation unit 414, a feedback (FB) calculation unit 415, a resolution unit 416, and an override determination unit 417.

The target value generation unit 411 takes, as its input, the target lateral acceleration Gy* from the driving assistance application 50, and calculates a target yaw rate $\gamma^*$ to be elicited in the vehicle based on the inputted target lateral acceleration Gy* so that the lateral acceleration acting on the vehicle becomes the target lateral acceleration Gy*. The target yaw rate $\gamma^*$ can be calculated by, for example, dividing the target lateral acceleration Gy* by a vehicle speed V and then subtracting, from that value, a time derivative value of a vehicle body slip angle $\beta$ (d$\beta$/dt). In addition, the target value generation unit 411 may take, as its input, a change amount of the target lateral acceleration Gy* (dGy*/dt), an application execution request signal $S_{\_Appli.}$, and so on from the driving assistance application 50. The target lateral acceleration change amount dGy*/dt is used in order to calculate the target yaw rate $\gamma^*$. The application execution request signal $S_{\_Appli.}$ is a signal for requesting the yaw rate to be controlled based on the target lateral acceleration Gy* outputted from the driving assistance application 50.

The state monitoring unit 412 takes, as its inputs, a front wheel steering angle $\delta f$ from a front wheel steering angle sensor attached to the vehicle, a rear wheel steering angle $\delta r$ from a rear wheel steering angle sensor, a wheel torque TW of each of the wheels from torque sensors attached to the respective wheels, and the vehicle speed V from a vehicle speed sensor. The state monitoring unit 412 estimates the current state of the vehicle based on the inputted information, and outputs a vehicle generation limit physical amount representing the estimated state of the vehicle (for example, a vehicle generation limit yaw rate). In vehicle motion control, it is important to determine whether or not lateral motion is occurring in the light of safety, and to estimate the elicited lateral motion amount in the light of performance. Therefore the state monitoring unit 412 outputs one or more of cornering powers Cfr, Cfl, Crr, and Crl for the respective wheels, a yaw rate, a lateral acceleration, a road surface $\mu$, and a slip rate s that can occur in the vehicle as benchmarks indicating the estimated state of the vehicle (a vehicle generation limit physical amount). The amount of outputted information may be selected as appropriate based on the capabilities of the application, the sensors attached to the vehicle, and so on; and not particularly limited thereto.

The availability amount calculation unit 413 takes, as its input, the current state of the vehicle from the state monitoring unit 412. The availability amount calculation unit 413 also takes as inputs the front steering availability theoretical yaw rate $\gamma_{\_FSTR\_Act\_Ava}$, the rear steering availability theoretical yaw rate $\gamma_{\_RSTR\_Act\_Ava}$, and the DYC availability theoretical yaw rate $\gamma_{\_DYC\_Act\_Ava}$. Furthermore, the availability amount calculation unit 413 takes application information from the driving assistance application 50 as an input. The application information is, for example, information indicating whether or not the actuators can be used, or information representing yaw rate control characteristics.

The availability amount calculation unit 413 then calculates a front steering availability yaw rate $\gamma_{\_FSTR\_Ava}$, a rear steering availability yaw rate $\gamma_{\_RSTR\_Ava}$, and a DYC availability yaw rate $\gamma_{\_DYC\_Ava}$ based on the aforementioned vehicle generation limit physical amount representing the vehicle state, the front steering availability theoretical yaw rate $\gamma\_{FSTR\_Act\_Ava}$, the rear steering availability theoretical yaw rate $\gamma\_{RSTR\_Act\_Ava}$, the DYC availability theoretical yaw rate $\gamma\_{DYC\_Act\_Ava}$, and the application information.

The front steering availability yaw rate $\gamma\_{FSTR\_Ava}$ indicates a maximum value (or range) for the yaw rate that can actually be elicited in the vehicle when the front steering actuator 14 operates, in the case where the vehicle generation limit physical amount representing the vehicle state and the application information are taken into consideration. The rear steering availability yaw rate $\gamma\_{RSTR\_Ava}$ indicates a maximum value (or range) for the yaw rate that can actually be elicited in the vehicle when the rear steering actuator 22 operates, in the case where the vehicle generation limit physical amount representing the vehicle state and the application information are taken into consideration. The DYC availability yaw rate $\gamma\_{DYC\_Ava}$ indicates a maximum value (or range) for the yaw rate that can actually be elicited in the vehicle when the DYC actuator 32 operates, in the case where the vehicle generation limit physical amount representing the vehicle state and the application information are taken into consideration. A table that represents correspondence relationships between the various availability yaw rates, the vehicle generation limit physical amount representing the vehicle state, the front steering availability theoretical yaw rate $\gamma\_{FSTR\_Act\_Ava}$, the rear steering availability theoretical yaw rate $\gamma\_{RSTR\_Act\_Ava}$, the DYC availability theoretical yaw rate $\gamma\_{DYC\_Act\_Ava}$, and so on is stored in the availability amount calculation unit 413. The respective availability yaw rates are calculated based on the various pieces of inputted information by referring to the above-mentioned table.

The feed-forward calculation unit 414 takes, as its inputs, the target yaw rate $\gamma^*$ and the respective availability yaw rates (the front steering availability yaw rate $\gamma\_{FSTR\_Ava}$, the rear steering availability yaw rate $\gamma\_{RSTR\_Ava}$, and the DYC availability yaw rate $\gamma\_{DYC\_Ava}$). Meanwhile, the feed-forward calculation unit 414 includes a control object selection unit 414a, a reference calculation unit 414b, and a feed-forward control amount distribution unit 414c.

The control object selection unit 414a selects an actuator (control object) that can be used in the vehicle yaw rate control based on the respective availability yaw rates. The control object selection unit 414a determines a priority order for the usable actuators. In this case, for example, when application information representing emphasis on the responsiveness of yaw rate control is inputted into the availability amount calculation unit 413, the priority order is determined so that the actuator with the fastest response (for example, the DYC actuator 32) has the highest priority, the actuator with the next-fastest response (for example, the front steering actuator 14) has the second-highest priority, and the actuator with the slowest response (for example, the rear steering actuator 22) has the third-highest priority.

The reference calculation unit 414b takes as an input the target yaw rate $\gamma^*$ from the target value generation unit 411, and calculates a feed-forward yaw rate reference amount $\gamma\_{ref}$ that simulates vehicle response delay by executing a reference calculation on the target yaw rate $\gamma^*$. Because it is used in feedback calculation, the feed-forward yaw rate reference amount $\gamma\_{ref}$ is outputted to the feedback calculation unit 415.

The feed-forward control amount distribution unit 414c distributes a feed-forward yaw rate control amount $\gamma\_{FF}$ calculated based on the feed-forward yaw rate reference amount $\gamma\_{ref}$ calculated by the reference calculation unit 414b as a front steering feed-forward yaw rate control amount $\gamma\_{FSTR\_FF}$, a rear steering feed-forward yaw rate control amount $\gamma\_{RSTR\_FF}$, and a DYC feed-forward yaw rate control amount $\gamma\_{DYC\_FF}$. The front steering feed-forward yaw rate control amount $\gamma\_{FSTR\_FF}$ is a feed-forward control amount for a yaw rate elicited in the vehicle by actuating the front steering actuator 14. The rear steering feed-forward yaw rate control amount $\gamma\_{RSTR\_FF}$ is a feed-forward control amount for a yaw rate elicited in the vehicle by actuating the rear steering actuator 22. The DYC feed-forward yaw rate control amount $\gamma\_{DYC\_FF}$ is a feed-forward control amount for a yaw rate elicited in the vehicle by actuating the DYC actuator 32.

In this case, the feed-forward control amount distribution unit 414c distributes the feed-forward yaw rate control amount $\gamma\_{FF}$ based on the priority order determined by the control object selection unit 414a and the respective availability yaw rates. For example, in the case where the calculated feed-forward yaw rate control amount $\gamma\_{FF}$ is 10, the front steering actuator 14 has the highest priority, the rear steering actuator 22 has the second-highest priority, the DYC actuator 32 has the third-highest priority, the front steering availability yaw rate $\gamma\_{FSTR\_Ava}$ is 6, the rear steering availability yaw rate $\gamma\_{RSTR\_Ava}$ is 3, and the DYC availability yaw rate $\gamma\_{DYC\_Ava}$ is 3; in this case, the feed-forward yaw rate control amount $\gamma\_{FF}$ is distributed so that the front steering feed-forward yaw rate control amount $\gamma\_{FSTR\_FF}$ is 6, the rear steering feed-forward yaw rate control amount $\gamma\_{RSTR\_FF}$ is 3, and the DYC feed-forward yaw rate control amount $\gamma\_{DYC\_FF}$ is 1. The respective distributed feed-forward yaw rate control amounts are then outputted to the feedback calculation unit 415 and the resolution unit 416.

The feedback calculation unit 415 takes as its inputs the respective availability yaw rates (the front steering availability yaw rate $\gamma\_{FSTR\_Ava}$, the rear steering availability yaw rate $\gamma\_{RSTR\_Ava}$, and the DYC availability yaw rate $\gamma\_{DYC\_Ava}$) from the availability amount calculation unit 413, the respective feed-forward yaw rate control amounts (the front steering feed-forward yaw rate control amount $\gamma\_{FSTR\_FF}$, the rear steering feed-forward yaw rate control amount $\gamma\_{RSTR\_FF}$, and the DYC feed-forward yaw rate control amount $\gamma\_{DYC\_FF}$) from the feed-forward calculation unit 414, the feed-forward yaw rate reference amount $\gamma\_{ref}$, and a yaw rate $\gamma$ from a yaw rate sensor attached to the vehicle. Meanwhile, the feedback calculation unit 415 includes a control object selection unit 415a and a feedback control amount calculation unit 415b.

The control object selection unit 415a selects an actuator that can be used in the vehicle yaw rate control based on an allowance amount calculated from the respective availability yaw rates and the respective feed-forward yaw rate control amounts. The control object selection unit 415a also determines a priority order for the usable actuators.

The feedback control amount calculation unit 415b controls the vehicle yaw rate through feedback based on the deviation $\Delta\gamma(=\gamma\_{ref}-\gamma)$ between the inputted feed-forward yaw rate reference amount $\gamma\_{ref}$ and yaw rate $\gamma$. For example, in the case where the feedback control is PID control, a feedback yaw rate control amount $\gamma\_{FB}$ is calculated through the following Equation (1).

$$\gamma\_{FB} = K_p \cdot \Delta\gamma + K_i \cdot \int \Delta\gamma dt + K_d \cdot \frac{d\Delta\gamma}{dt} \quad (1)$$

In the above Equation (1), $K_p$ indicates a proportional gain, $K_i$ indicates an integrated gain, and $K_d$ indicates a derivative gain.

Furthermore, the feedback control amount calculation unit 415b distributes the calculated feedback yaw rate control amount $\gamma_{\_FB}$ as a front steering feedback yaw rate control amount $\gamma_{\_FSTR\_FB}$, a rear steering feedback yaw rate control amount $\gamma_{\_RSTR\_FB}$, and a DYC feedback yaw rate control amount $\gamma_{\_DYC\_FB}$. The front steering feedback yaw rate control amount $\gamma_{\_FSTR\_FB}$ is a feedback control amount for a yaw rate caused to occur in the vehicle by actuating the front steering actuator 14. The rear steering feedback yaw rate control amount $\gamma_{\_RSTR\_FB}$ is a feedback control amount for a yaw rate caused to occur in the vehicle by actuating the rear steering actuator 22. The DYC feedback yaw rate control amount $\gamma_{\_DYC\_FB}$ is a feedback control amount for a yaw rate caused to occur in the vehicle by actuating the DYC actuator 32.

In this case, the feedback control amount calculation unit 415b distributes the feedback yaw rate control amount $\gamma_{\_FB}$ in accordance with the priority order for usable actuators determined by the control object selection unit 415a. The feedback control amount calculation unit 415b then outputs the distributed feedback yaw rate control amounts (the front steering feedback yaw rate control amount $\gamma_{\_FSTR\_FB}$, the rear steering feedback yaw rate control amount $\gamma_{\_RSTR\_FB}$, and the DYC feedback yaw rate control amount $\gamma_{\_DYC\_FB}$) to the resolution unit 416.

The resolution unit 416 includes a final value calculation unit 416a and a control permission determination unit 416b. The final value calculation unit 416a calculates the front steering yaw rate control amount $\gamma_{\_FSTR}$ by adding the front steering feed-forward yaw rate control amount $\gamma_{\_FSTR\_FF}$ inputted from the feed-forward calculation unit 414 with the front steering feedback yaw rate control amount $\gamma_{\_FSTR\_FB}$ inputted from the feedback calculation unit 415. The calculated front steering yaw rate control amount $\gamma_{\_FSTR}$ and the front steering actuation request signal $S_{\_FSTR}$ for requesting the front steering actuator 14 to actuate are then outputted to the front-wheel steering angle conversion unit 42. The resolution unit 416 calculates the rear steering yaw rate control amount $\gamma_{\_RSTR}$ by adding the rear steering feed-forward yaw rate control amount $\gamma_{\_RSTR\_FF}$ inputted from the feed-forward calculation unit 414 with the rear steering feedback yaw rate control amount $\gamma_{\_RSTR\_FB}$ inputted from the feedback calculation unit 415. The calculated rear steering yaw rate control amount $\gamma_{\_RSTR}$ and the rear steering actuation request signal $S_{\_RSTR}$ for requesting the rear steering actuator 22 to actuate are then outputted to the rear-wheel steering conversion unit 43. Furthermore, the resolution unit 416 calculates the DYC yaw rate control amount $\gamma_{\_DYC}$ by adding the DYC feed-forward yaw rate control amount $\gamma_{\_DYC\_FF}$ inputted from the feed-forward calculation unit 414 with the DYC feedback yaw rate control amount $\gamma_{\_DYC\_FB}$ inputted from the feedback calculation unit 415. The calculated DYC yaw rate control amount $\gamma_{\_DYC}$ and the DYC actuation request signal $S_{\_DYC}$ for requesting the DYC actuator 32 to actuate are then outputted to the DYC axle torque conversion unit 44.

As shown in FIG. 2, the front-wheel steering angle conversion unit 42 takes the front steering yaw rate control amount $\gamma_{\_FSTR}$ as its input. In addition, a front wheel target steering (turning) angle $\delta f^*$ necessary to elicit a yaw rate corresponding to the front steering yaw rate control amount $\gamma_{\_FSTR}$ in the vehicle through actuation of the front steering actuator 14 is calculated. A signal representing the calculated front wheel target steering angle $\delta f^*$ is then outputted to the front steering actuator 14. Due to this output signal, the actuation of the front steering actuator 14 is controlled so that the front wheel steering (turning) angle $\delta f$ becomes the front wheel target steering angle $\delta f^*$, or in other words, so that a yaw rate corresponding to the front steering yaw rate control amount $\gamma_{\_FSTR}$ is generated in the vehicle through actuation of the front steering actuator 14.

The rear-wheel conversion unit 43 takes the rear steering yaw rate control amount $\gamma_{\_RSTR}$ as its input. In addition, a rear wheel target steering (turning) angle $\delta r^*$ necessary to elicit a yaw rate corresponding to the rear steering yaw rate control amount $\gamma_{\_RSTR}$ in the vehicle through actuation of the rear steering actuator 22 is calculated. A signal representing the calculated rear wheel target steering angle $\delta r^*$ is then outputted to the rear steering actuator 22. Due to this output signal, the actuation of the rear steering actuator 22 is controlled so that the rear wheel steering (turning) angle $\delta r$ becomes the rear wheel target steering angle $\delta r^*$, or in other words, so that a yaw rate corresponding to the rear steering yaw rate control amount $\gamma_{\_RSTR}$ is generated in the vehicle through actuation of the rear steering actuator 22.

The DYC axle torque conversion unit 44 takes the DYC yaw rate control amount $\gamma_{\_DYC}$ as its input. In addition, a target DYC torque $Tb^*$ necessary to elicit a yaw rate corresponding to the DYC yaw rate control amount $\gamma_{\_DYC}$ in the vehicle through operations of the DYC actuator 32 is calculated. A signal representing the calculated target DYC torque $Tb^*$ is then outputted to the DYC actuator 32 that applies the braking force to the wheel on turning inside among the wheels. Due to this output signal, the operation of the DYC actuator 32 is controlled so that an axle torque Tb acting on the wheel on turning inside becomes the target DYC torque $Tb^*$, or in other words, so that a yaw rate corresponding to the DYC yaw rate control amount $\gamma_{\_DYC}$ is generated in the vehicle through actuation of the DYC actuator 32.

As a result of the cooperative control of the plurality of actuators (the front steering actuator 14, the rear steering actuator 22, and the DYC actuator 32), the yaw rate (lateral motion amount) of the vehicle is controlled so that the target lateral acceleration $Gy^*$ inputted from the driving assistance application 50 is generated in the vehicle.

Meanwhile, as shown in FIG. 3, the yaw rate calculation unit 41 includes the override determination unit 417. The override determination unit 417 takes, as its input, a steering torque Ts from a steering torque sensor attached to the vehicle. The target lateral acceleration $Gy^*$ from the driving assistance application is also inputted. The override determination unit 417 compares the inputted steering torque Ts with a threshold value $Ts_{th}$ for the steering torque Ts, and determines whether or not the driver is steering intentionally based on the result of the comparison. An override determination flag F representing the result of the determination is then outputted to the control permission determination unit 416b of the resolution unit 416.

Figure 4:
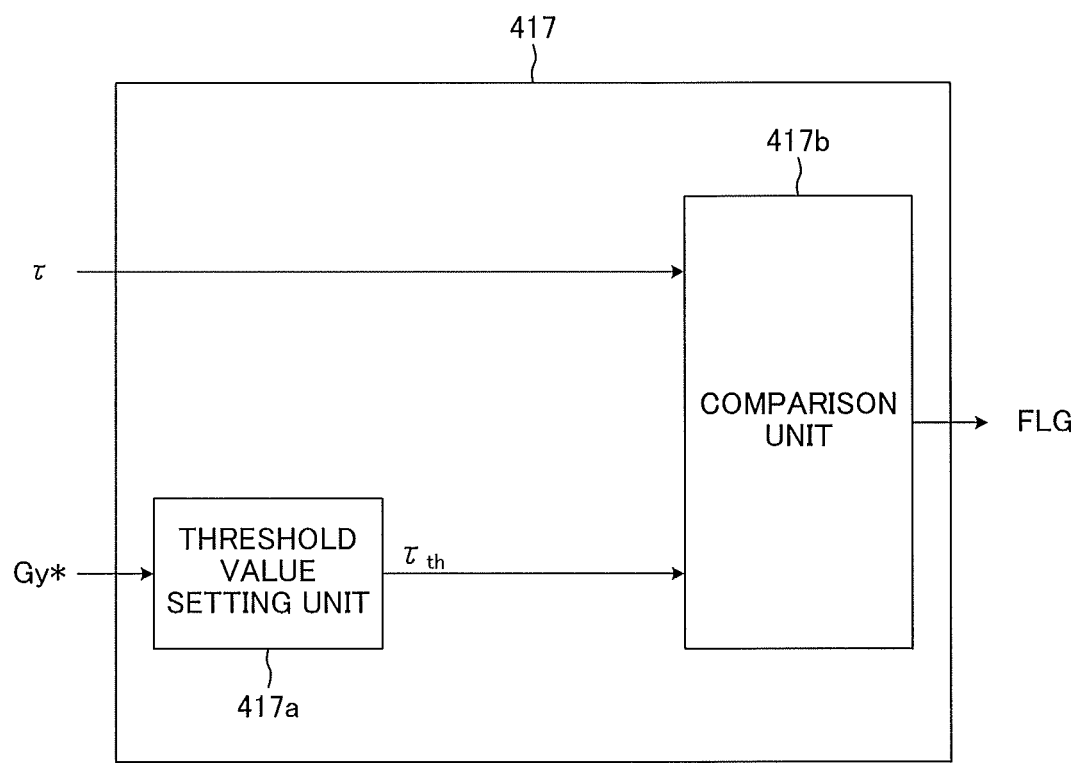
FIG. 4 is a diagram illustrating the functional configuration of an override determination unit.

FIG. 4 is a block diagram illustrating the functional configuration of the override determination unit 417. As shown in FIG. 4, the override determination unit 417 includes a threshold value setting unit 417a and a comparison unit 417b. The threshold value setting unit 417a sets the threshold value $Ts_{th}$ for the magnitude of the steering torque for determining whether or not an override is occurring based on the target lateral acceleration $Gy^*$. The comparison unit 417b determines whether or not an override is occurring by comparing the steering torque Ts and the threshold value $Ts_{th}$, and outputs the override determination flag F that indicates the result of that determination.

Figure 5:
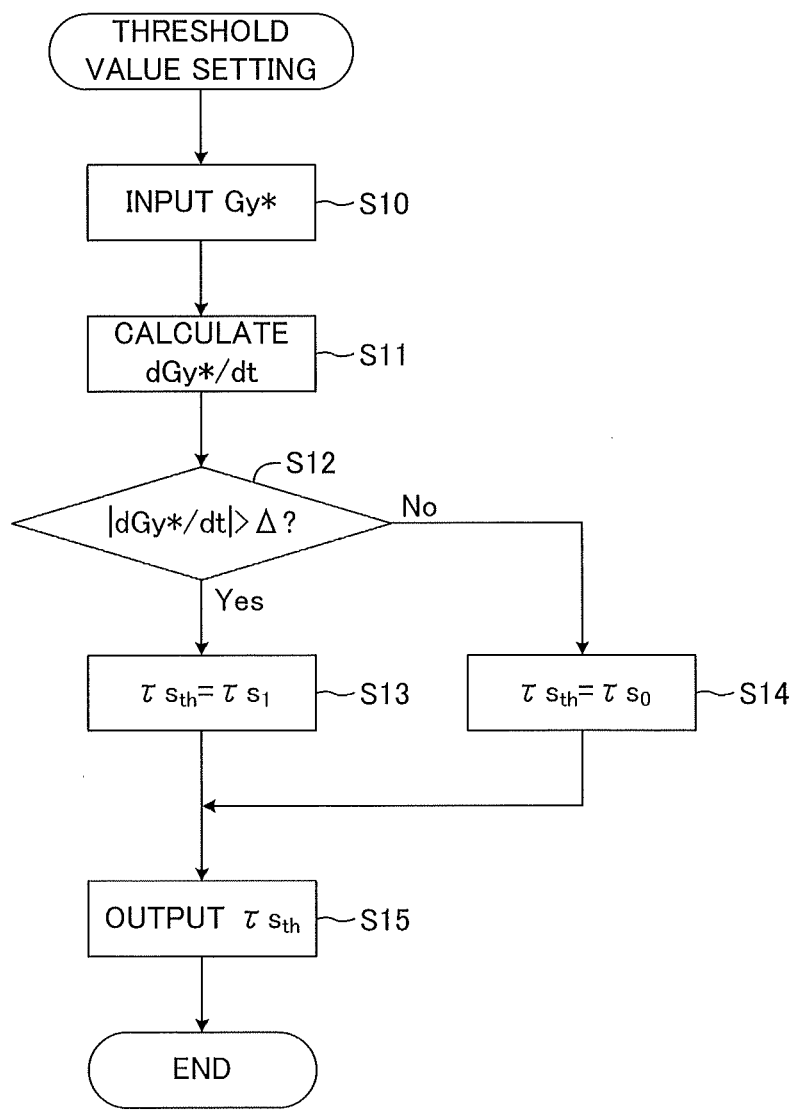
FIG. 5 is a flowchart illustrating a threshold value setting routine executed by a threshold value setting unit according to a first embodiment.

FIG. 5 is a flowchart illustrating a threshold value setting routine executed by the threshold value setting unit 417a. This routine is executed repeatedly every predetermined short amount of time. When the routine is launched, the threshold value setting unit 417a takes the target lateral acceleration Gy* as an input in step ("step" will be abbreviated as "S" hereinafter) 10. Then, the target lateral acceleration change amount dGy*/dt, which is a time derivative value of the target lateral acceleration Gy*, is calculated (S11). Next, it is determined whether or not the absolute value |dGy*/dt| of the target lateral acceleration change amount dGy*/dt is greater than a predetermined minute value Δ (S12). The minute value Δ is a value for determining whether or not the target lateral acceleration Gy* has changed, and is set in advance. In the case where it has been determined in S12 that the absolute value |dGy*/dt| is less than the minute value Δ (S12: No), the threshold value setting unit 417a sets the threshold value $TS_{th}$ to a reference threshold value $TS_0$ (S14). On the other hand, in the case where it has been determined that the absolute value |dGy*/dt| is greater than the minute value Δ (S12: Yes), the threshold value setting unit 417a sets the threshold value $TS_{th}$ to a first threshold value $TS_1$ (S13). Here, the first threshold value $TS_1$ is greater than the reference threshold value $TS_0$. After setting the threshold value $TS_{th}$ in S13 or S14, the threshold value setting unit 417a outputs the threshold value $TS_{th}$ in S15. Thereafter, the routine ends.

Figure 6:
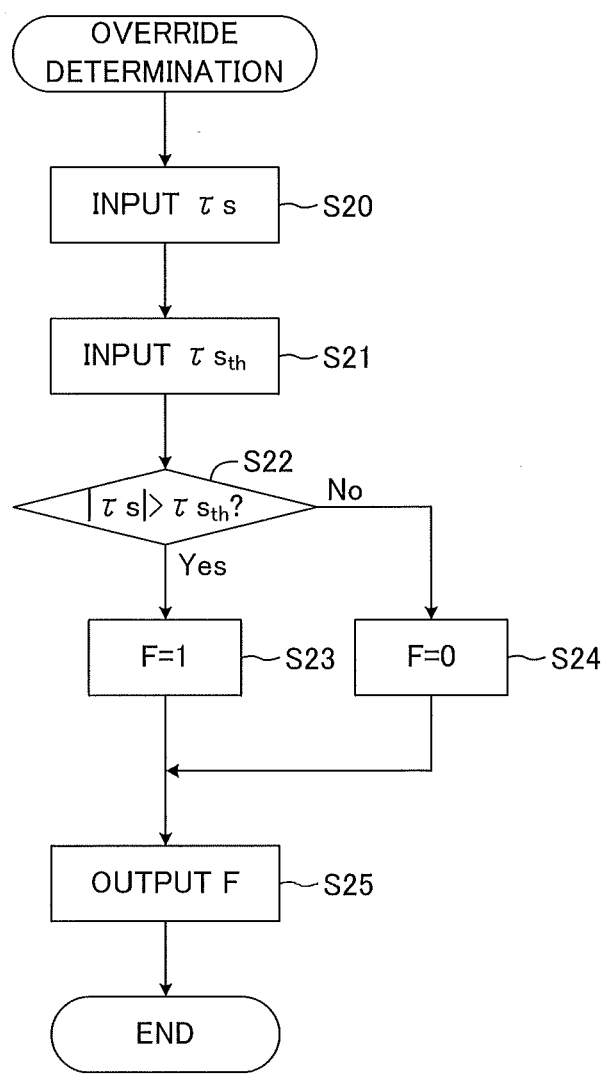
FIG. 6 is a flowchart illustrating an override determination routine executed by a comparison unit.

FIG. 6 is a flowchart illustrating an override determination routine executed by the comparison unit 417b. This routine is executed repeatedly every predetermined short amount of time. When the routine is launched, firstly in S20 of FIG. 6, the comparison unit 417b takes the steering torque TS as its input. The threshold value $TS_{th}$ is then inputted as well (S21). Then, it is determined whether or not the absolute value |TS| representing the magnitude of the steering torque is greater than the threshold value $TS_{th}$ (S22). In the case where the absolute value |TS| is greater than the threshold value $TS_{th}$ (S22: Yes), the comparison unit 417b determines that the driver is steering intentionally, advances to S23, and sets the override determination flag F to 1. Meanwhile, in the case where the absolute value |TS| is less than or equal to the threshold value $TS_{th}$ (S22: No), the comparison unit 417b determines that the driver is not steering intentionally, advances to S24, and sets the override determination flag F to 0. After the override determination flag F has been set to 0 or 1 in S23 or S24, the override determination flag F is outputted (S25). Thereafter, the routine ends.

As shown in FIG. 3, the override determination flag F set by the override determination unit 417 is inputted into the control permission determination unit 416b of the resolution unit 416. When the override determination flag F has been set to 0, the control permission determination unit 416b permits to control the actuators based on the respective yaw rate control amounts $γ_{\_FSTR}$, $γ_{\_RSTR}$, and $γ_{\_DYC}$ calculated as described above. Through this, the respective actuators operate, thus controlling the yaw rate of the vehicle. Meanwhile, when the override determination flag F is set to 1, the control permission determination unit 416b stops the yaw rate control of the vehicle by the operation of the respective actuators. In this case, suddenly stopping the yaw rate control of the vehicle leads to instability in the behavior of the vehicle. Accordingly, in the case where the inputted override determination flag F has changed from 1 to 0, the control permission determination unit 416b may execute a process that gradually reduces the control amount of the respective actuators from that time and stops the control after a predetermined amount of time has passed (that is, a control degeneration process).

Figure 7:
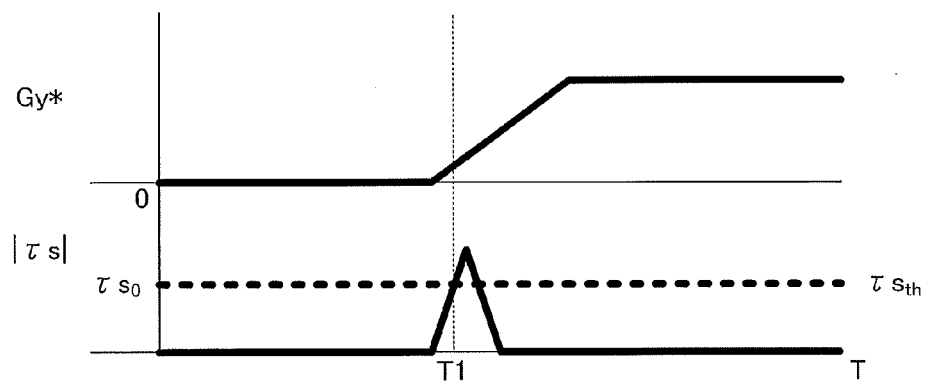
FIG. 7 is a graph illustrating a state of change over time in a target lateral acceleration Gy* and a steering torque absolute value |TS|, along with a constant threshold value $TS_{th}$.
Figure 8:
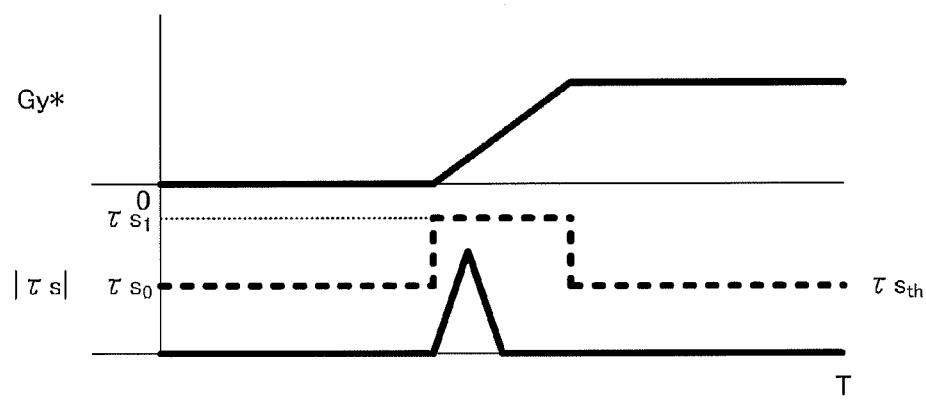
FIG. 8 is a graph illustrating a state of change over time in a target lateral acceleration Gy* and a steering torque absolute value |TS|, along with a threshold value $TS_{th}$ that changes in accordance with changes in the target lateral acceleration Gy*.

FIGS. 7 and 8 are graphs illustrating states of changes over time in the target lateral acceleration Gy* (or the target yaw rate γ*) and the steering torque absolute value |TS|. In FIGS. 7 and 8, the horizontal axis represents time. In addition, the threshold value $TS_{th}$ to which the steering torque absolute value |TS| is compared is indicated by a dotted line. As shown in FIG. 7, the steering torque absolute value |TS| temporarily increases in the case where the target lateral acceleration Gy* has changed. In the case where the target lateral acceleration Gy* has changed, the operation states of the respective actuators change as well. For example, the operation amount of the front steering actuator 14 changes in accordance with the change in the target lateral acceleration Gy*. As a result, the automatic steering amount of the steering wheel also changes in accordance with the change in the operation amount of the front steering actuator 14. In the case where the driver is holding the steering wheel at this time, the driver feels a sense of discomfort at the change in the automatic steering amount, and holds onto the steering wheel. The steering torque absolute value |TS| increases as a result of the driver holding onto the steering wheel. However, there are cases where the driver releases his or her hold on the steering wheel in response to the change in the automatic steering amount. As a result, the steering torque absolute value |TS| decreases. In this manner, the magnitude of the steering torque TS temporarily increases when the target lateral acceleration Gy* changes.

The steering torque TS that temporarily increases due to a change in the target lateral acceleration Gy* is not a steering torque intentionally inputted through the steering wheel based on the driver's explicit intent to steer. Accordingly, in this case, the driver is not steering intentionally. However, even if a steering torque TS has been generated through a steering operation that is not carried out intentionally, the yaw rate control is stopped in the case where the magnitude of that steering torque TS has exceeded the threshold value $TS_{th}$. It is particularly likely for the yaw rate control to be stopped in the case where the threshold value $TS_{th}$ is constant regardless of changes in the target lateral acceleration Gy*, when the magnitude of the steering torque TS that has increased due to a steering operation not carried out intentionally exceeds the threshold value $TS_{th}$. For example, as shown in FIG. 7, the magnitude of the steering torque TS that increases in response to changes in the target lateral acceleration Gy* exceeds the constant threshold value $TS_{th}$ (the reference threshold value $TS_0$) at the point in time of T1, and thus the yaw rate control is stopped at that point in time. Accordingly, the driver will experience a sense of discomfort, caused by the yaw rate control being stopped in spite of the driver not intending to stop the yaw rate control.

On the other hand, in the present embodiment, a threshold value set when the target lateral acceleration Gy* changes is greater than a threshold value set when the target lateral acceleration Gy* does not change. In other words, the threshold value $TS_{th}$ is increased when the target lateral acceleration Gy* changes. FIG. 8 is a graph illustrating changes over time in the target lateral acceleration Gy* and the absolute value |T| of the steering torque TS, along with the threshold value $TS_{th}$ that changes in accordance with changes in the target lateral acceleration Gy*. As shown in FIG. 8, the threshold value $TS_{th}$ set when the target lateral acceleration Gy* does not change is the reference threshold value $TS_0$, whereas the threshold value $TS_{th}$ set when the target lateral acceleration Gy* changes is the first threshold value $TS_1$. The first threshold value $TS_1$ is greater than the reference threshold value $TS_0$.

As can be seen in FIG. 8, the steering torque absolute value |TS| increases in the case where the target lateral acceleration Gy* has changed; however, the threshold value $TS_{th}$ is increased at the same time, and thus the magnitude of the steering torque TS does not exceed the threshold value $TS_{th}$. For this reason, the yaw rate control resulting from the operations of the respective actuators is continued. In other words, the present embodiment prevents the yaw rate control from being stopped due to steering torque that has been generated in spite of there being no intent to stop the yaw rate control.

In this manner, according to the present embodiment, the threshold value $TS_{th}$ is set based on the target lateral acceleration $Gy^*$ so that the threshold value $TS_{th}$ that is set when the target lateral acceleration $Gy^*$ has changed becomes greater than the threshold value $TS_{th}$ that is set when the target lateral acceleration $Gy^*$ has not changed. This prevents or suppresses such a case that the magnitude of the steering torque $TS$ that increases along with changes in the target lateral acceleration $Gy^*$ exceeds the threshold value $TS_{th}$. Accordingly, the lateral motion control is prevented from being stopped due to a steering operation not carried out intentionally. In other words, according to the lateral motion control apparatus 40 of the present embodiment, it is possible to accurately determine whether or not a driver is steering intentionally during lateral motion control.

(Second Embodiment)

The above first embodiment describes an example in which the threshold value $TS_{th}$ is set based on the target lateral acceleration $Gy^*$ so that the threshold value $TS_{th}$ increases when the target lateral acceleration $Gy^*$ has changed. The second embodiment describes an example in which the threshold value $TS_{th}$ is set based on the target lateral acceleration $Gy^*$ so that the threshold value $TS_{th}$ increases the greater the change amount of the target lateral acceleration $Gy^*$ becomes, or so that the change amount (amount of increase) in the threshold value $TS_{th}$ increases the greater the change amount of the target lateral acceleration $Gy^*$ becomes.

Figure 9:
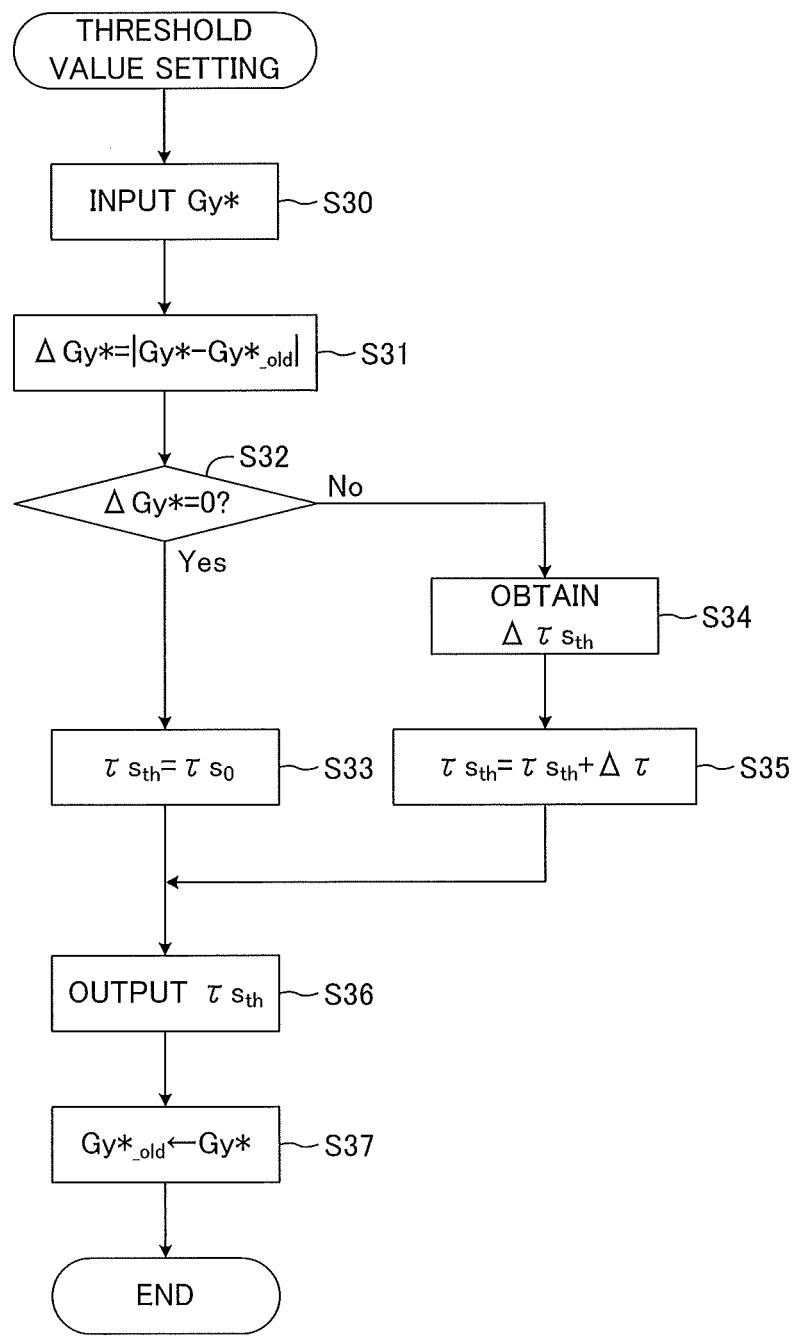
FIG. 9 is a flowchart illustrating a threshold value setting routine executed by a threshold value setting unit according to a second embodiment.

FIG. 9 is a flowchart illustrating a threshold value setting routine executed by the threshold value setting unit 417a in the present embodiment. This routine is executed repeatedly every predetermined short amount of time. When the routine is launched, the threshold value setting unit 417a firstly takes the target lateral acceleration $Gy^*$ as an input in S30. Next, a target lateral acceleration change amount $\Delta Gy^*$ is calculated (S31). The target lateral acceleration change amount $\Delta Gy^*$ is the absolute value of the difference between the target lateral acceleration $Gy^*$ inputted in S30 the current time this routine is executed and an old target lateral acceleration $Gy^*_{\_old}$, which is the target lateral acceleration inputted in S30 the previous time the routine was executed. Next, the threshold value setting unit 417a determines whether or not the target lateral acceleration change amount $\Delta Gy^*$ is 0, or in other words, whether or not the target lateral acceleration $Gy^*$ has changed (S32). In the case where the target lateral acceleration change amount $\Delta Gy^*$ is 0 (S32: Yes), the threshold value setting unit 417a advances to S33, where the threshold value $TS_{th}$ is set to the reference threshold value $TS_0$.

On the other hand, in the case where the target lateral acceleration change amount $\Delta Gy^*$ is not 0 (S32: No), the threshold value setting unit 417a advances to S34, where a threshold value change amount $\Delta TS_{th}$ is obtained. To obtain the threshold value change amount $\Delta TS_{th}$, the threshold value setting unit 417a refers to a lateral acceleration change amount-threshold value change amount table stored in the override determination unit 417.

Figure 10:
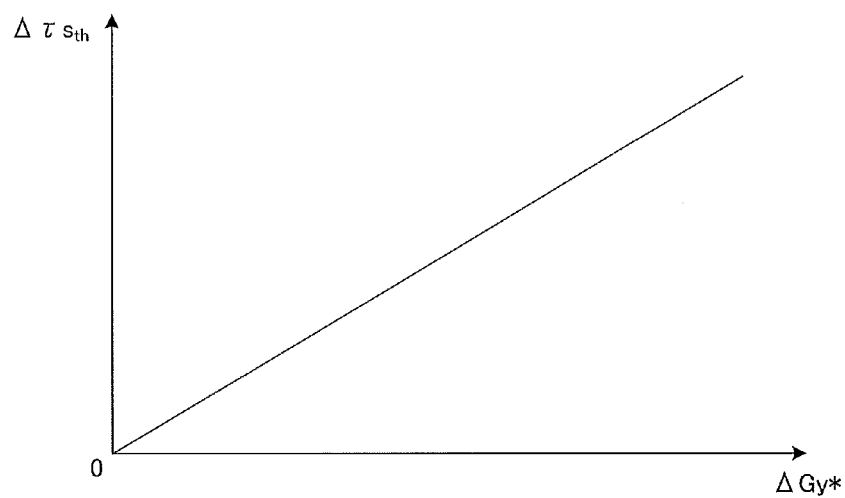
FIG. 10 is a diagram in which an example of a lateral acceleration change amount-threshold value change amount table is represented as a graph.

FIG. 10 is a diagram in which an example of the lateral acceleration change amount-threshold value change amount table is represented as a graph. In this graph, the horizontal axis represents the target lateral acceleration change amount $\Delta Gy^*$, whereas the vertical axis indicates the threshold value change amount $\Delta TS_{th}$. As shown in FIG. 10, the threshold value change amount $\Delta TS_{th}$ is greater the greater the target lateral acceleration change amount $\Delta Gy^*$ is. The threshold value setting unit 417a refers to this lateral acceleration change amount-threshold value change amount table in S34, and obtains the threshold value change amount $\Delta TS_{th}$ corresponding to the target lateral acceleration change amount $\Delta Gy^*$.

After the threshold value change amount $\Delta TS_{th}$ has been obtained in S34, the threshold value setting unit 417a sets a new threshold value $TS_{th}$ by adding the threshold value change amount $\Delta TS_{th}$ to the threshold value $TS_{th}$ that is currently set (S35).

After the threshold value $TS_{th}$ has been set in S33 or S35, the threshold value setting unit 417a advances to S36, where the set threshold value $TS_{th}$ is outputted. Next, the old target lateral acceleration $Gy^*_{\_old}$ is updated by replacing the old target lateral acceleration $Gy^*_{\_old}$ with the target lateral acceleration $Gy^*$ inputted in S30 (S37). Thereafter, the routine ends. In this manner, the threshold value $TS_{th}$ is set based on the target lateral acceleration $Gy^*$ so that the threshold value $TS_{th}$ increases as the target lateral acceleration change amount $\Delta Gy^*$ (the change amount in the target lateral acceleration $Gy^*$) increases, or so that the change amount of the threshold value $TS_{th}$ increases as the target lateral acceleration change amount $\Delta Gy^*$ increases. Note that because other configurations are the same as the configurations described in the aforementioned first embodiment, descriptions of those other configurations will be omitted.

Figure 11:
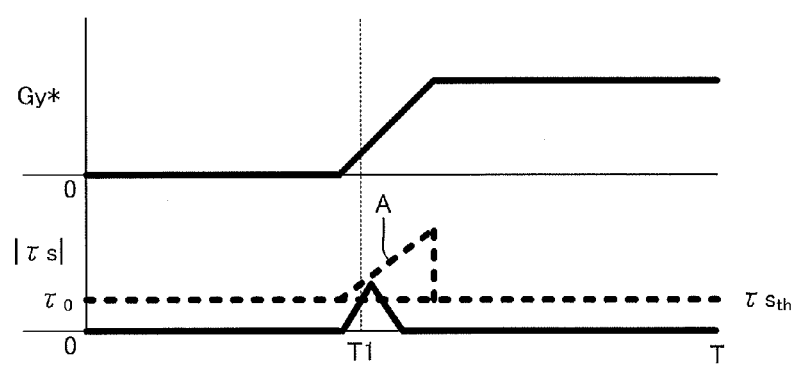
FIG. 11 is a graph illustrating a state of change over time in a target lateral acceleration Gy* and a steering torque absolute value |TS|, along with a threshold value $TS_{th}$ that changes in accordance with a target lateral acceleration change amount ΔGy*.
Figure 12:
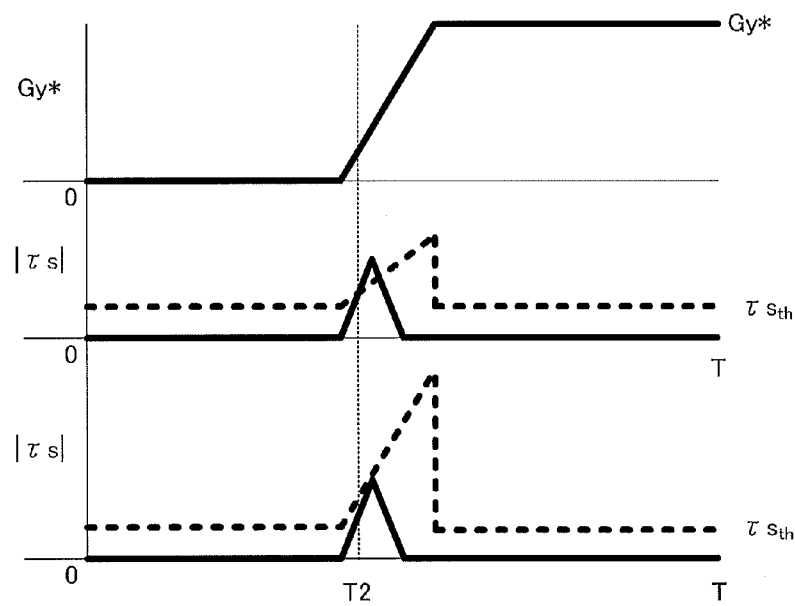
FIG. 12 is a graph illustrating a state of change over time in a target lateral acceleration Gy* and a steering torque absolute value |TS|, along with a threshold value $TS_{th}$ that changes in accordance with a target lateral acceleration change amount ΔGy*.

FIGS. 11 and 12 are graphs illustrating states of changes over time in the target lateral acceleration $Gy^*$ (or the target yaw rate $\gamma^*$) and the steering torque absolute value |TS|, along with the threshold value $TS_{th}$ that changes in accordance with the target lateral acceleration change amount $\Delta Gy^*$ as described in the present embodiment. In FIGS. 11 and 12, the horizontal axis represents time. Furthermore, the threshold value $TS_{th}$ is indicated by the dotted line in FIGS. 11 and 12. As shown in FIG. 11, the magnitude of the steering torque absolute value |TS| temporarily increases in the case where the target lateral acceleration $Gy^*$ has changed. In this case, the steering torque absolute value |TS| exceeds the threshold value $TS_{th}$ at the point in time of T1 in the case where the threshold value $TS_{th}$ is constant (that is, $TS_{th}=TS_0$) regardless of changes in the target lateral acceleration $Gy^*$. Thus the yaw rate control is stopped regardless of the driver's intent.

However, in the case where the threshold value $TS_{th}$ is changed so as to increase as the target lateral acceleration change amount $\Delta Gy^*$ increases, the threshold value $TS_{th}$ also increases along with increase of the target lateral acceleration $Gy^*$, as indicated by the line A in FIG. 11. Therefore, this prevents or suppresses such a case where the steering torque absolute value |TS| that increases along with changes in the target lateral acceleration $Gy^*$ exceeds the threshold value $TS_{th}$. Accordingly, the lateral motion control is prevented from being stopped due to a steering operation not carried out intentionally. In other words, according to the lateral motion control apparatus 40 of the present embodiment, it is possible to accurately determine whether or not a driver is steering intentionally during lateral motion control.

Furthermore, the steering torque absolute value |TS| that increases along with changes in the target lateral acceleration $Gy^*$ is greater the greater the magnitude of the change amount in the target lateral acceleration $Gy^*$ is. Accordingly, in the case where the change amount in the threshold value $TS_{th}$ is constant regardless of the magnitude of the change amount in the target lateral acceleration $Gy^*$, the steering torque absolute value |TS| exceeds the threshold value $TS_{th}$ at the point in time of T2, as shown in the middle section of the graph in FIG. 12. Thus the yaw rate control is stopped regardless of the driver's intent. On the other hand, in the present embodiment, the change amount in the threshold value $TS_{th}$ is greater the greater the change amount in the target lateral acceleration Gy* is. Thus, this prevents or suppresses such a case where the steering torque TS that increases along with changes in the target lateral acceleration Gy* exceeds the threshold value $TS_{th}$, as indicated in the lower section of the graph in FIG. 12. Accordingly, the lateral motion control is prevented from being stopped due to a steering operation not carried out intentionally. In other words, according to the lateral motion control apparatus 40 of the present embodiment, it is possible to accurately determine whether or not a driver is steering intentionally during lateral motion control.

(Third Embodiment)

The first and second embodiments describe examples in which the threshold value $TS_{th}$ is changed based on changes in the target lateral acceleration Gy* or the change amount in the target lateral acceleration Gy*. The present embodiment, however, describes an example in which the threshold value $TS_{th}$ is changed based on the direction of the yaw rate elicited by the target lateral acceleration Gy* acting on the vehicle (that is, the direction of the target yaw rate γ*) and the direction of the yaw rate elicited by the driver making a steering operation.

Figure 13:
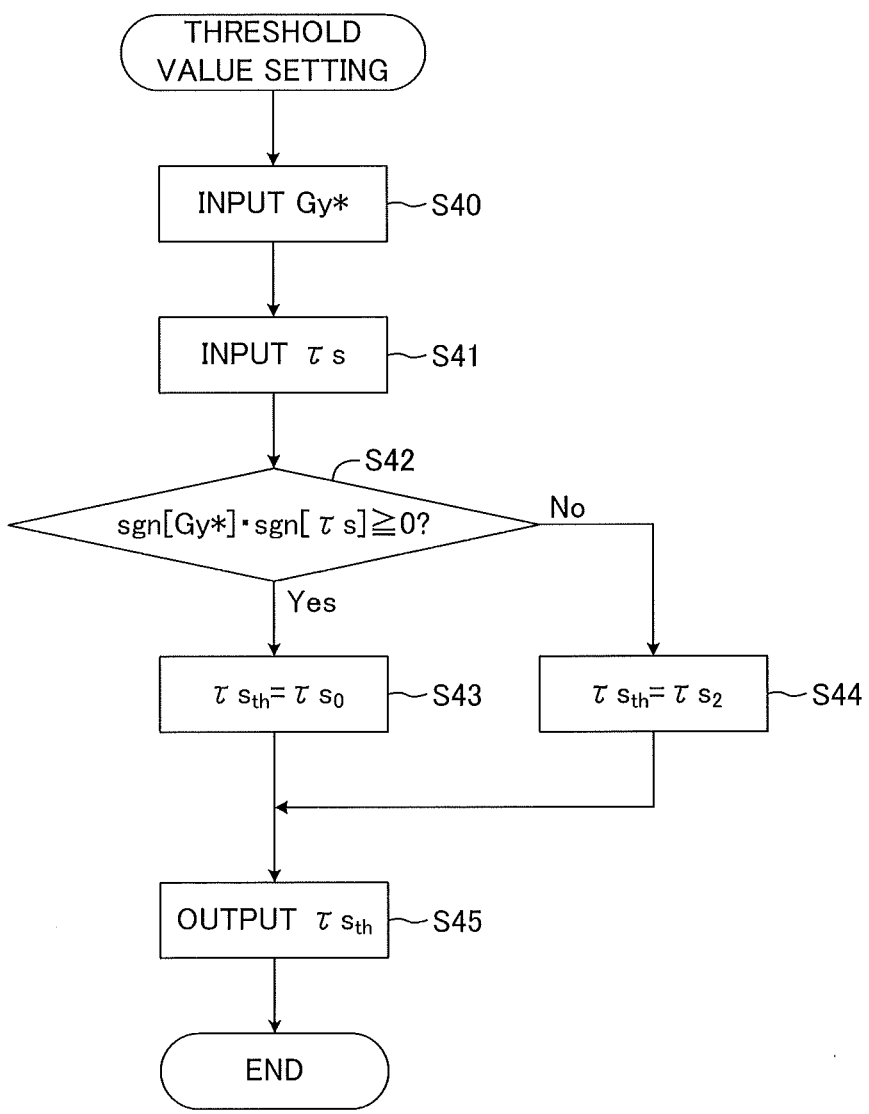
FIG. 13 is a flowchart illustrating a threshold value setting routine executed by a threshold value setting unit according to a third embodiment.

FIG. 13 is a flowchart illustrating a threshold value setting routine executed by the threshold value setting unit 417a in the present embodiment. This routine is executed repeatedly every predetermined short amount of time. When the routine is launched, the threshold value setting unit 417a firstly takes the target lateral acceleration Gy* as an input in S40 of FIG. 13. Here, the inputted target lateral acceleration Gy* is a positive value, a negative value, or 0. When the target lateral acceleration Gy* is a positive value, the target lateral acceleration Gy* acting on the vehicle elicits a yaw rate in the direction that turns the vehicle to the right. Meanwhile, when the target lateral acceleration Gy* is a negative value, the target lateral acceleration Gy* acting on the vehicle elicits a yaw rate in the direction that turns the vehicle to the left.

Next, the threshold value setting unit 417a takes, as its input, the steering torque TS inputted to the steering wheel by the steering torque sensor attached to the vehicle (S41). Here, the inputted steering torque TS is a positive value, a negative value, or 0. When the steering torque TS is a positive value, the front steering mechanism operates as a result of the steering torque TS, eliciting a yaw rate in the direction that turns the vehicle to the right. Meanwhile, when the steering torque TS is a negative value, the front steering mechanism operates as a result of the steering torque TS, eliciting a yaw rate in the direction that turns the vehicle to the left.

Next, the threshold value setting unit 417a determines whether or not the product of a sign function sgn(Gy*) of the inputted target lateral acceleration Gy* and a sign function sgn(T) of the inputted steering torque TS is greater than or equal to 0 (S42). A sign function sgn(α) is a function that indicates whether a variable α is positive or negative; when the variable α is positive, sgn(α) is 1, whereas when the variable α is negative, sgn(α) is −1.

When the product of the sign functions in S42 is greater than or equal to 0 (that is, is 0 or 1) (S42: Yes), the direction of the yaw rate elicited by the target lateral acceleration Gy* acting on the vehicle (that is, the direction of the target yaw rate γ*) and the direction of the yaw rate of the vehicle elicited by a steering operation performed by the driver are the same. In this case, the threshold value setting unit 417a advances to S43, where the threshold value $TS_{th}$ is set to the reference threshold value $TS_0$. However, when the product of the sign functions in S42 is negative (−1) (S42: No), the direction of the yaw rate elicited by the target lateral acceleration Gy* acting on the vehicle (that is, the direction of the target yaw rate γ*) is different from the direction of the yaw rate of the vehicle elicited by a steering operation performed by the driver. In this case, the threshold value setting unit 417a advances to S44, where the threshold value $TS_{th}$ is set to a second threshold value $TS_2$. Here, the second threshold value $TS_2$ is less than the reference threshold value $TS_0$. After setting the threshold value $TS_{th}$ in S43 or S44, the threshold value setting unit 417a outputs the set threshold value $TS_{th}$. Thereafter, the routine ends. By setting the threshold value $TS_{th}$ in this manner, the threshold value $TS_{th}$ changes in accordance with the product of the sign function of the target lateral acceleration Gy* and the sign function of the steering torque TS. Note that because other configurations are the same as the configurations described in the aforementioned first embodiment, descriptions of those other configurations will be omitted.

FIGS. 14 through 17 are graphs illustrating various states of change over time in the target lateral acceleration Gy* (or the target yaw rate γ*), the steering torque TS, and the steering torque absolute value |TS|, along with the threshold value $TS_{th}$ set using the method described in the present embodiment. In FIGS. 14 through 17, the horizontal axis represents time. In addition, in FIGS. 14 through 17, the threshold value $TS_{th}$ to which the steering torque absolute value |TS| is compared is indicated by a dotted line.

Figure 14:
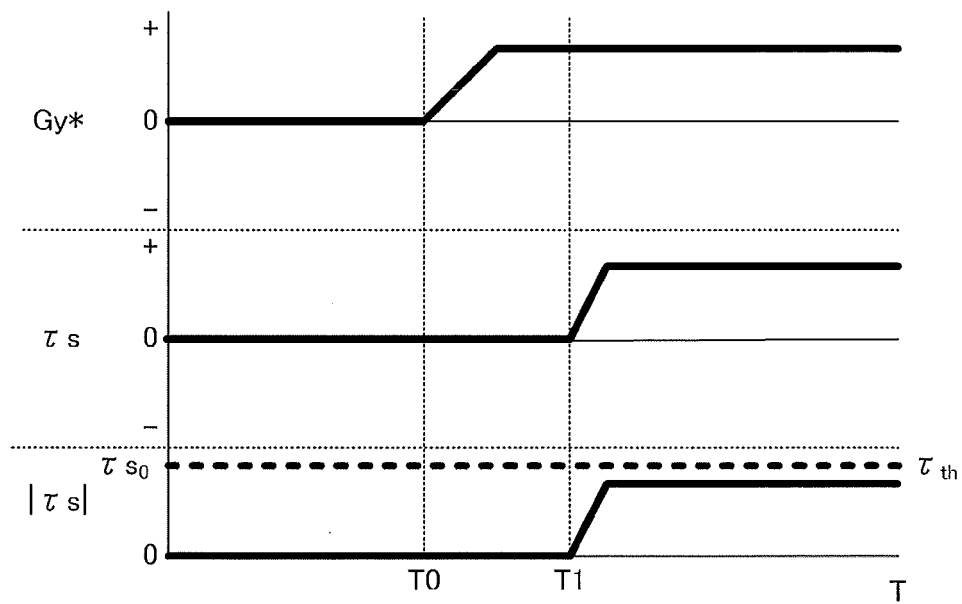
FIG. 14 is a graph illustrating a state of change over time in a target lateral acceleration Gy*, a steering torque TS, and a steering torque absolute value |TS|, along with a threshold value $TS_{th}$ set using a method illustrated in the third embodiment.

According to FIG. 14, the target lateral acceleration Gy* and the steering torque TS are both 0 prior to time T0. At time T0, the target lateral acceleration Gy* changes from 0 to a positive value. After that, at time T1, the steering torque TS also changes from 0 to a positive value. Because the steering torque TS is 0 prior to time T1, the result of the determination in S42 of FIG. 13 is Yes, and thus the threshold value $TS_{th}$ is the reference threshold value $TS_0$. Furthermore, because the target lateral acceleration Gy* and the steering torque TS are positive values after time T1, the result of the determination in S42 of FIG. 13 is Yes, and thus the threshold value $TS_{th}$ is the reference threshold value $TS_0$. Therefore, the threshold value $TS_{th}$ is constant ($TS_0$) within the time range indicated in FIG. 14. In addition, although the steering torque TS starts to change at time T1, the steering torque absolute value |TS| does not exceed the threshold value $TS_{th}$ (which is $TS_0$) after the change. Therefore, the yaw rate control is continued.

Figure 15:
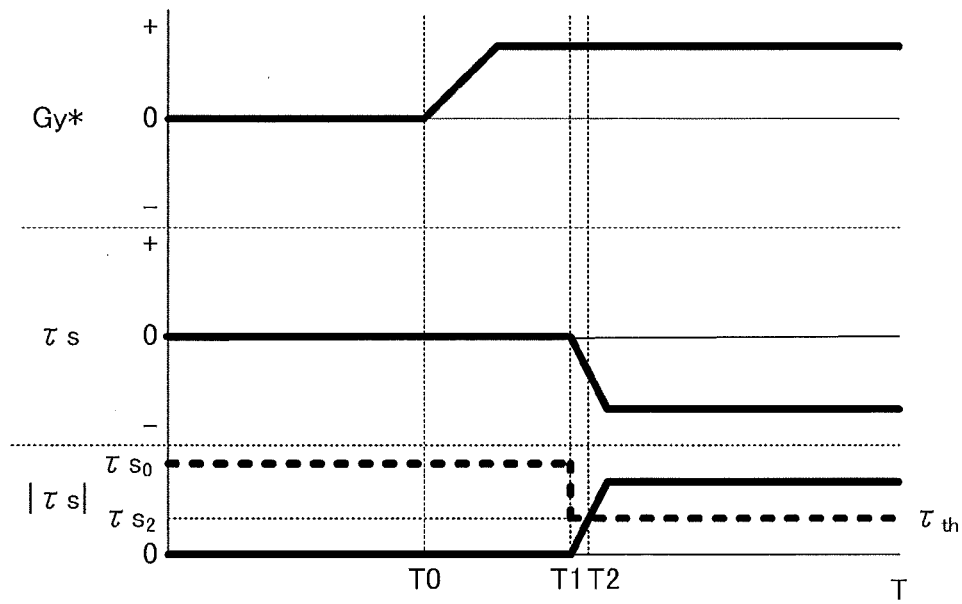
FIG. 15 is a graph illustrating another state of change over time in a target lateral acceleration Gy*, a steering torque TS, and a steering torque absolute value |TS|, along with a threshold value $TS_{th}$ set using a method illustrated in the third embodiment.

According to FIG. 15, meanwhile, the target lateral acceleration Gy* and the steering torque TS are both 0 prior to time T0. At time T0, the target lateral acceleration Gy* changes from 0 to a positive value. After that, at time T1, the steering torque TS changes from 0 to a negative value. Because the steering torque TS is 0 prior to time T1, the result of the determination in S42 of FIG. 13 is Yes, and thus the threshold value $TS_{th}$ is the reference threshold value $TS_0$. However, because the target lateral acceleration Gy* is a positive value and the steering torque TS is a negative value after time T1, the result of the determination in S42 of FIG. 13 is No. Accordingly, the threshold value $TS_{th}$ changes from the reference threshold value $TS_0$ to the second threshold value $TS_2$ at time T1. The second threshold value $TS_2$ is set to a value that is much lower than the reference threshold value $TS_0$, thus the steering torque absolute value |TS| exceeds the threshold value $TS_{th}$ (which is $TS_2$) at time T2. Therefore, the yaw rate control is stopped at time T2.

Figure 16:
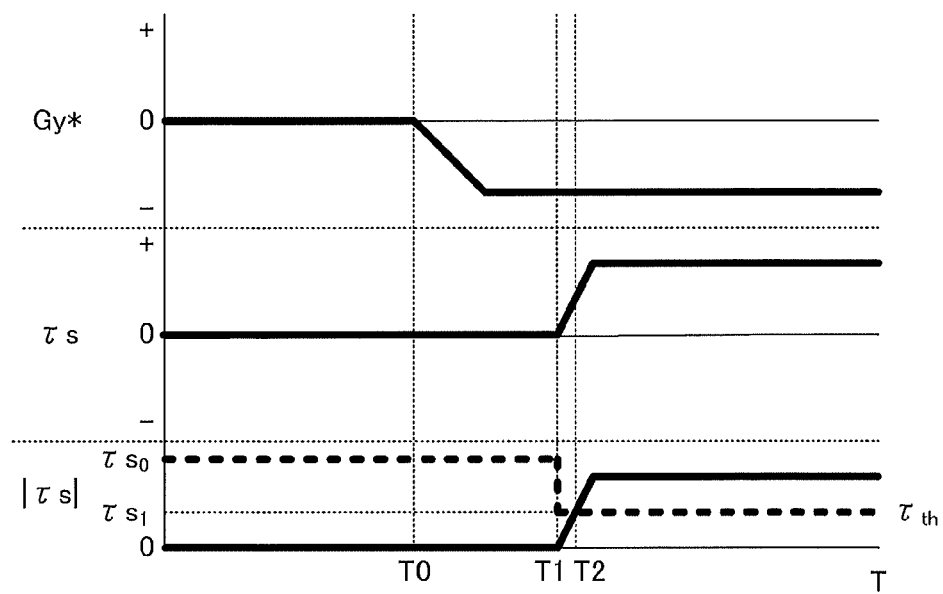
FIG. 16 is a graph illustrating another state of change over time in a target lateral acceleration Gy*, a steering torque TS, and a steering torque absolute value |TS|, along with a threshold value $TS_{th}$ set using a method illustrated in the third embodiment.

Furthermore, according to FIG. 16, the target lateral acceleration Gy* and the steering torque TS are both 0 prior to time T0. At time T0, the target lateral acceleration Gy* changes from 0 to a negative value. After that, at time T1, the steering torque TS changes from 0 to a positive value. Because the steering torque TS is 0 prior to time T1, the result of the determination in S42 of FIG. 13 is Yes, and thus the threshold value $TS_{th}$ is the reference threshold value $TS_0$. However, because the target lateral acceleration Gy* is a negative value and the steering torque TS is a positive value after time T1, the result of the determination in S42 of FIG. 13 is No. Accordingly, the threshold value $TS_{th}$ changes from the reference threshold value $TS_0$ to the second threshold value $TS_2$ at time T1. The second threshold value $TS_2$ is set to a value that is much lower than the reference threshold value $TS_0$, thus the steering torque absolute value |TS| exceeds the threshold value $TS_{th}$ (which is $TS_2$) at time T2. Therefore, the yaw rate control is stopped at time T2.

Figure 17:
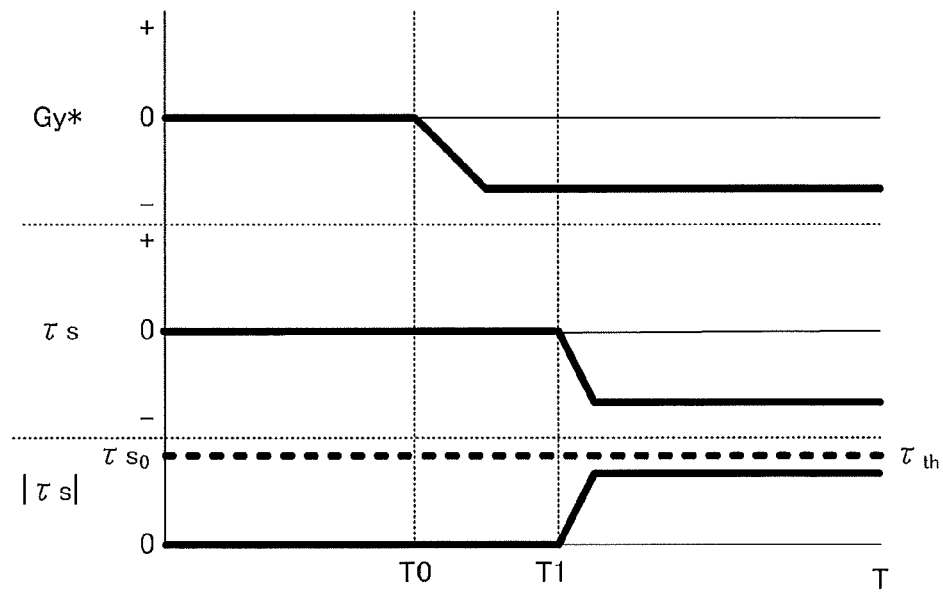
FIG. 17 is a graph illustrating another state of change over time in a target lateral acceleration Gy*, a steering torque TS, and a steering torque absolute value |TS|, along with a threshold value $TS_{th}$ set using a method illustrated in the third embodiment.

Furthermore, according to FIG. 17, the target lateral acceleration Gy* and the steering torque TS are both 0 prior to time T0. At time T0, the target lateral acceleration Gy* changes from 0 to a negative value. After that, at time T1, the steering torque TS changes from 0 to a negative value. Because the steering torque TS is 0 prior to time T1, the result of the determination in S42 of FIG. 13 is Yes, and thus the threshold value $TS_{th}$ is the reference threshold value $TS_0$. Furthermore, because the target lateral acceleration Gy* and the steering torque TS are negative values after time T1, the result of the determination in S42 of FIG. 13 is Yes, and thus the threshold value $TS_{th}$ is the reference threshold value $TS_0$. Therefore, the threshold value $TS_{th}$ is constant ($TS_0$) within the time range indicated in FIG. 17. In addition, although the steering torque TS starts to change at time T1, the steering torque absolute value |TS| does not exceed the threshold value $TS_{th}$ (which is $TS_0$) after the change. Therefore, the yaw rate control is continued.

In the case where the target lateral acceleration Gy* and the steering torque TS change as shown in FIGS. 14 and 17, the direction of the yaw rate elicited as a result of the front steering mechanism operating in accordance with the steering torque TS (the right turning direction in the case of FIG. 14 and the left turning direction in the case of FIG. 17) is the same as the direction of the target yaw rate γ* elicited by the target lateral acceleration Gy* acting on the vehicle (the right turning direction in the case of FIG. 14 and the left turning direction in the case of FIG. 17). In the case where the direction of the yaw rate elicited under the steering torque TS inputted by the driver is the same as the direction of the target yaw rate γ*, it is uncertain whether or not the driver is steering intentionally. In this case, the threshold value $TS_{th}$ is kept at the reference threshold value $TS_0$, as shown in FIGS. 14 and 17. This prevents the yaw rate control from being stopped unnecessarily.

Meanwhile, in the case where the target lateral acceleration Gy* and the steering torque TS change as shown in FIGS. 15 and 16, the direction of the yaw rate elicited as a result of the front steering mechanism operating in accordance with the steering torque TS (the left turning direction in the case of FIG. 15 and the right turning direction in the case of FIG. 16) is different from the direction of the target yaw rate γ* elicited by the target lateral acceleration Gy* acting on the vehicle (the right turning direction in the case of FIG. 15 and the left turning direction in the case of FIG. 16). In the case where the direction of the yaw rate elicited under the steering torque TS inputted by the driver is different from the direction of the target yaw rate, it is highly likely that the driver is steering intentionally. In this case, the threshold value $TS_{th}$ drops from the reference threshold value $TS_0$ to the second threshold value $TS_2$, as shown in FIGS. 15 and 16. This makes it easier for the yaw rate control to be stopped. In this manner, whether or not the driver is steering intentionally is estimated based on the direction of the target yaw rate γ* and the direction of the yaw rate elicited by the driver performing a steering operation, and the threshold value $TS_{th}$ is set based on the result of the estimation; this makes it possible to quickly stop the yaw rate control in the case were the driver has performed a steering operation intentionally. In other words, according to the lateral motion control apparatus 40 of the present embodiment, it is possible to accurately determine whether or not a driver is steering intentionally during lateral motion control.

(Fourth Embodiment)

The above third embodiment describes an example in which the threshold value $TS_{th}$ is changed based on the direction the vehicle turns due to the target lateral acceleration Gy* acting on the vehicle (that is, the direction of the target yaw rate γ*) and the direction of the yaw rate elicited by the driver performing a steering operation. However, the present embodiment describes an example in which the change amount in the threshold value $TS_{th}$ is changed in accordance with the change amount in the steering torque TS representing the change amount in the steering operation amount by the driver, when the direction the vehicle turns due to the target lateral acceleration Gy* acting on the vehicle (that is, the direction of the target yaw rate γ*) is different from the direction of the yaw rate elicited by the driver performing the steering operation.

Figure 18:
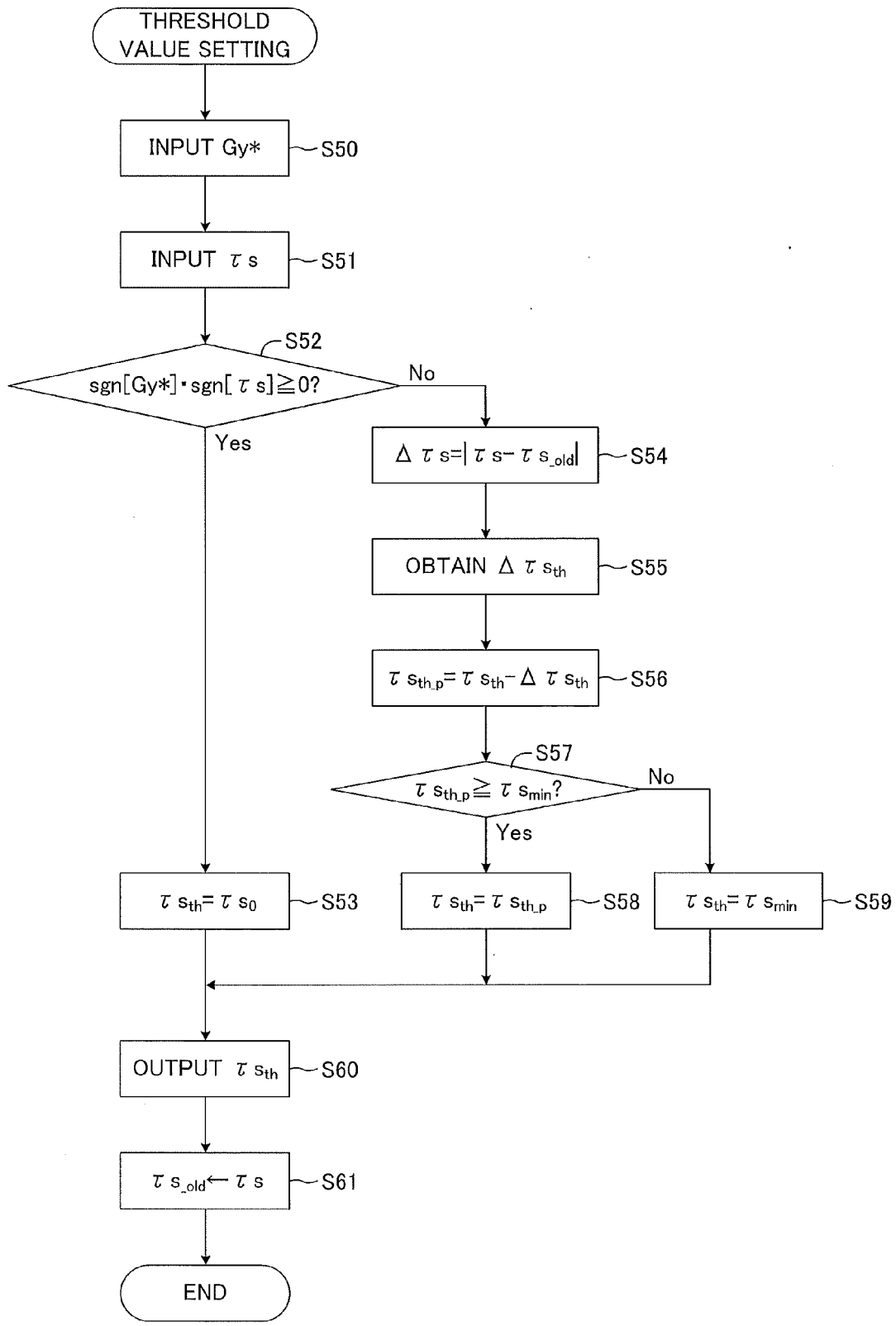
FIG. 18 is a flowchart illustrating a threshold value setting routine executed by a threshold value setting unit according to a fourth embodiment.

FIG. 18 is a flowchart illustrating a threshold value setting routine executed by the threshold value setting unit 417a in the present embodiment. This routine is executed repeatedly every predetermined short amount of time. When the routine is launched, the threshold value setting unit 417a firstly takes the target lateral acceleration Gy* as an input in S50 of FIG. 18. The inputted target lateral acceleration Gy* is a positive value, a negative value, or 0. The definitions of positive/negative (the signs) for the target lateral acceleration Gy* are the same as the definitions given in the above third embodiment.

Next, the threshold value setting unit 417a takes, as its input, the steering torque TS inputted to the steering wheel by the steering torque sensor attached to the vehicle (S51). Here, the inputted steering torque TS is a positive value, a negative value, or 0. The definitions of positive/negative (the signs) for the steering torque TS are the same as the definitions given in the above third embodiment.

Next, the threshold value setting unit 417a determines whether or not the product of a sign function sgn(Gy*) of the inputted target lateral acceleration Gy* and a sign function sgn(TS) of the inputted steering torque is greater than or equal to 0 (S52).

When it is determined in S52 that the product of the sign functions is greater than or equal to 0 (that is, 0 or 1) (S52: Yes), the threshold value setting unit 417a advances to S53, where the threshold value $TS_{th}$ is set to the reference threshold value $TS_0$. However, when it is determined in S52 that the product of the sign function is negative (−1) (S52: No), the threshold value setting unit 417a advances to S54, where the steering torque change amount ΔTS is calculated. The steering torque change amount ΔTS is the absolute value of the difference between the steering torque TS inputted in S51 at the current time this routine is executed and an old steering torque $TS\_{old}$, which is the steering torque inputted in S51 at the previous time the routine was executed. Next, the threshold value setting unit 417a obtains the threshold value change amount $ΔTS_{th}$ in S55. To obtain the threshold value change amount $ΔTS_{th}$, a steering torque change amount-threshold value change amount table stored in the override determination unit 417 is referred to.

Figure 19:
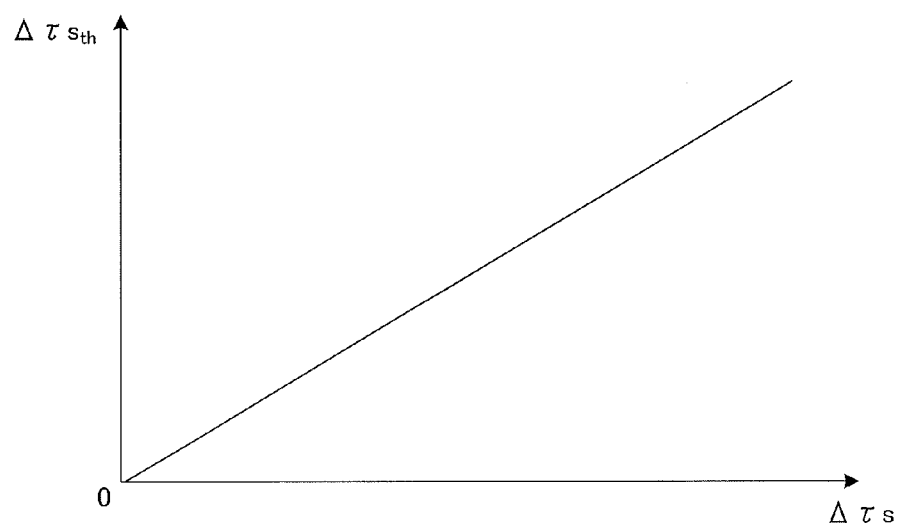
FIG. 19 is a diagram in which an example of a steering torque change amount-threshold value change amount table is represented as a graph.

FIG. 19 is a diagram in which an example of a steering torque change amount-threshold value change amount table is represented as a graph. In this graph, the horizontal axis represents the steering torque change amount ΔTS, whereas the vertical axis indicates the threshold value change amount $\Delta\text{TS}_{th}$. As shown in FIG. 19, the threshold value change amount $\Delta\text{TS}_{th}$ is greater the greater the steering torque change amount $\Delta\text{TS}$ is. The threshold value setting unit 417a refers to this steering torque change amount-threshold value change amount table in S55, and obtains the threshold value change amount $\Delta\text{TS}_{th}$ corresponding to the steering torque change amount $\Delta\text{TS}$. After obtaining the threshold value change amount $\Delta\text{TS}_{th}$, the threshold value setting unit 417a sets a provisional threshold value $\text{TS}_{th-p}$ by subtracting the threshold value change amount $\Delta\text{TS}_{th}$ from the currently-set threshold value $\text{TS}_{th}$ (S56).

Next, the threshold value setting unit 417a determines whether or not the provisional threshold value $\text{TS}_{th-p}$ is equal to or greater than a minimum threshold value $\text{TS}_{min}$ (S57). The minimum threshold value $\text{TS}_{min}$ is set in advance as the minimum value used for the threshold value for the steering torque absolute value |TS|. When the provisional threshold value $\text{TS}_{th-p}$ is equal to or greater than the minimum threshold value $\text{TS}_{min}$ (S57: Yes), the threshold value setting unit 417a sets the threshold value $\text{TS}_{th}$ to the provisional threshold value $\text{TS}_{th-p}$, (S58). However, when the provisional threshold value $\text{TS}_{th-p}$ is less than the minimum threshold value $\text{TS}_{min}$ (S57: No), the threshold value setting unit 417a sets the threshold value $\text{TS}_{th}$ to the minimum threshold value $\text{TS}_{min}$ (S59).

After the threshold value $\text{TS}_{th}$ has been set in S53, S58, or S59, the threshold value setting unit 417a outputs the set threshold value (S60). Then, the old steering torque $\text{TS}\_{old}$ is updated by replacing the old steering torque $\text{TS}\_{old}$ with the steering torque TS inputted in S51 (S61). Thereafter, the routine ends. In this manner, the threshold value $\text{TS}_{th}$ is set so that the change amount in the threshold value $\text{TS}_{th}$ changes in accordance with the change amount in the steering torque TS, and specifically so that the change amount (amount of decrease) in the threshold value $\text{TS}_{th}$ increases as the change amount in the steering torque TS increases.

Figure 20:
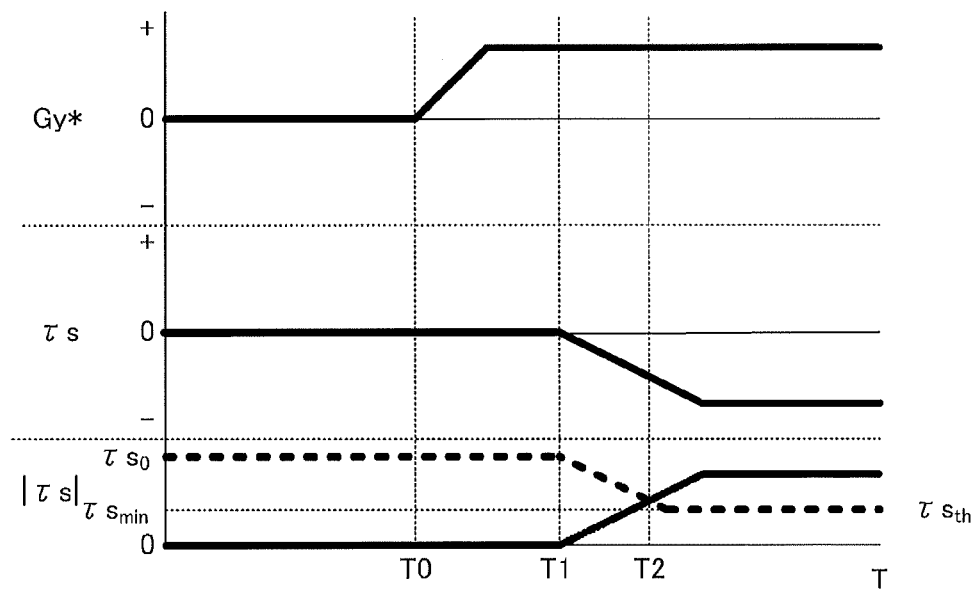
FIG. 20 is a graph illustrating a state of change over time in a target lateral acceleration Gy*, a steering torque TS, and a steering torque absolute value |TS|, along with a threshold value $TS_{th}$ set using a method illustrated in the fourth embodiment.
Figure 21:
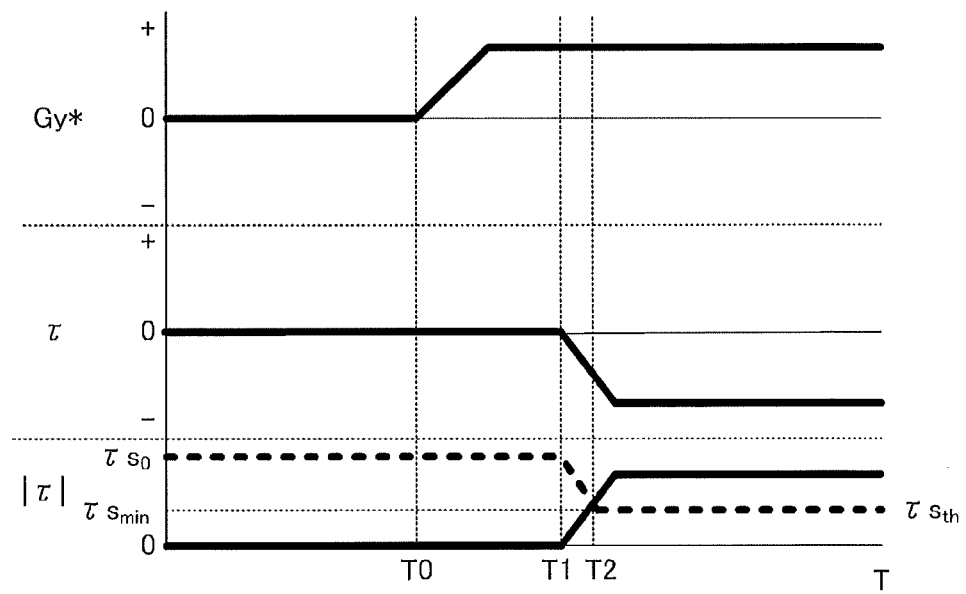
FIG. 21 is a graph illustrating another state of change over time in a target lateral acceleration Gy*, a steering torque TS, and a steering torque absolute value |TS|, along with a threshold value $TS_{th}$ set using a method illustrated in the fourth embodiment.

FIGS. 20 and 21 are graphs illustrating various states of change over time in the target lateral acceleration Gy* (or the target yaw rate γ*), the steering torque TS, and the steering torque absolute value |TS|, along with the threshold value $\text{TS}_{th}$ set using the method described in the present embodiment. In FIGS. 20 and 21, the horizontal axis represents time. In addition, in FIGS. 20 and 21, the threshold value $\text{TS}_{th}$ to which the steering torque absolute value |TS| is compared is indicated by a dotted line.

As can be seen from FIGS. 20 and 21, at time T0, the target lateral acceleration Gy* changes from 0 to a positive value, and after that, the steering torque TS changes from 0 to a negative value at time T1. Because the steering torque TS is 0 prior to time T1, the result of the determination in S52 of FIG. 18 is Yes, and thus the threshold value $\text{TS}_{th}$ is $\text{TS}_0$. However, because the target lateral acceleration Gy* is a positive value and the steering torque TS is a negative value after time T1, the result of the determination in S52 of FIG. 18 is No. Accordingly, the threshold value $\text{TS}_{th}$ starts to change at time T1. The change amount (amount of decrease) in the threshold value $\text{TS}_{th}$ at this time is greater the greater the change amount in the steering torque TS is.

In FIG. 20, the change amount in the steering torque TS that changes after time T1 is small, and thus the change amount (amount of decrease) in the threshold value $\text{TS}_{th}$ is small as well. In other words, the slope of the decrease in the threshold value $\text{TS}_{th}$ is not steep. However, in FIG. 21, the change amount in the steering torque TS that changes after time T1 is large, and thus the change amount (amount of decrease) in the threshold value $\text{TS}_{th}$ is large as well. In other words, the slope of the decrease in the threshold value $\text{TS}_{th}$ is steep. Note that the threshold value $\text{TS}_{th}$ is constant ($\text{TS}_{min}$) after the point in time when the threshold value $\text{TS}_{th}$ has become equal to the minimum threshold value $\text{TS}_{min}$.

In the case shown in FIG. 20, the amount of decrease in the threshold value $\text{TS}_{th}$ that starts to change at time T1 is small, and thus the amount of time (T2−T1) from time T1 to time T2, when the steering torque absolute value |TS| exceeds the threshold value $\text{TS}_{th}$, is long. However, in the case shown in FIG. 21, the amount of decrease in the threshold value $\text{TS}_{th}$ that starts to change at time T1 is large, and thus the amount of time (T2−T1) from time T1 to time T2, when the steering torque absolute value |TS| exceeds the threshold value $\text{TS}_{th}$, is short.

Even if the direction of the target yaw rate γ* elicited by the target lateral acceleration Gy* acting on the vehicle is different from the direction of the yaw rate elicited by the steering torque TS, there may be a case where the steering torque TS is not a steering torque generated by intentional steering on the part of the driver as long as the change amount in the steering torque TS is small. Therefore, in such a case, the timing at which the steering torque TS exceeds the threshold value $\text{TS}_{th}$, or in other words, the timing at which the yaw rate control is stopped, can be delayed by setting the slope of decrease of the threshold value $\text{TS}_{th}$ to a slope that is not steep, as shown in FIG. 20. By carrying out such a delay process on the timing at which the control is stopped, it is possible to even more effectively prevent the yaw rate control from being stopped unnecessarily.

Meanwhile, in the case where the direction of the target yaw rate γ* elicited by the target lateral acceleration Gy* acting on the vehicle is different from the direction of the yaw rate elicited by the steering torque TS and also the change amount in the steering torque TS is large, it can be assumed that the driver is performing a steering operation against the automatic steering. In such a case, it is highly likely that the steering torque TS is a steering torque generated as a result of intentional steering. Therefore, in such a case, the timing at which the steering torque TS exceeds the threshold value $\text{TS}_{th}$, or in other words, the timing at which the yaw rate control is stopped, can be advanced by setting the slope of decrease of the threshold value $\text{TS}_{th}$ to a slope that is steep, as shown in FIG. 21. Through this, the intentional steering of the driver can be sensed quickly and the yaw rate control can be stopped quickly in response thereto.

(Fifth Embodiment)

Next, a fifth embodiment will be described. According to this embodiment, the threshold value $\text{TS}_{th}$ changes in accordance with the control amount of the DYC actuator 32.

Figure 22:
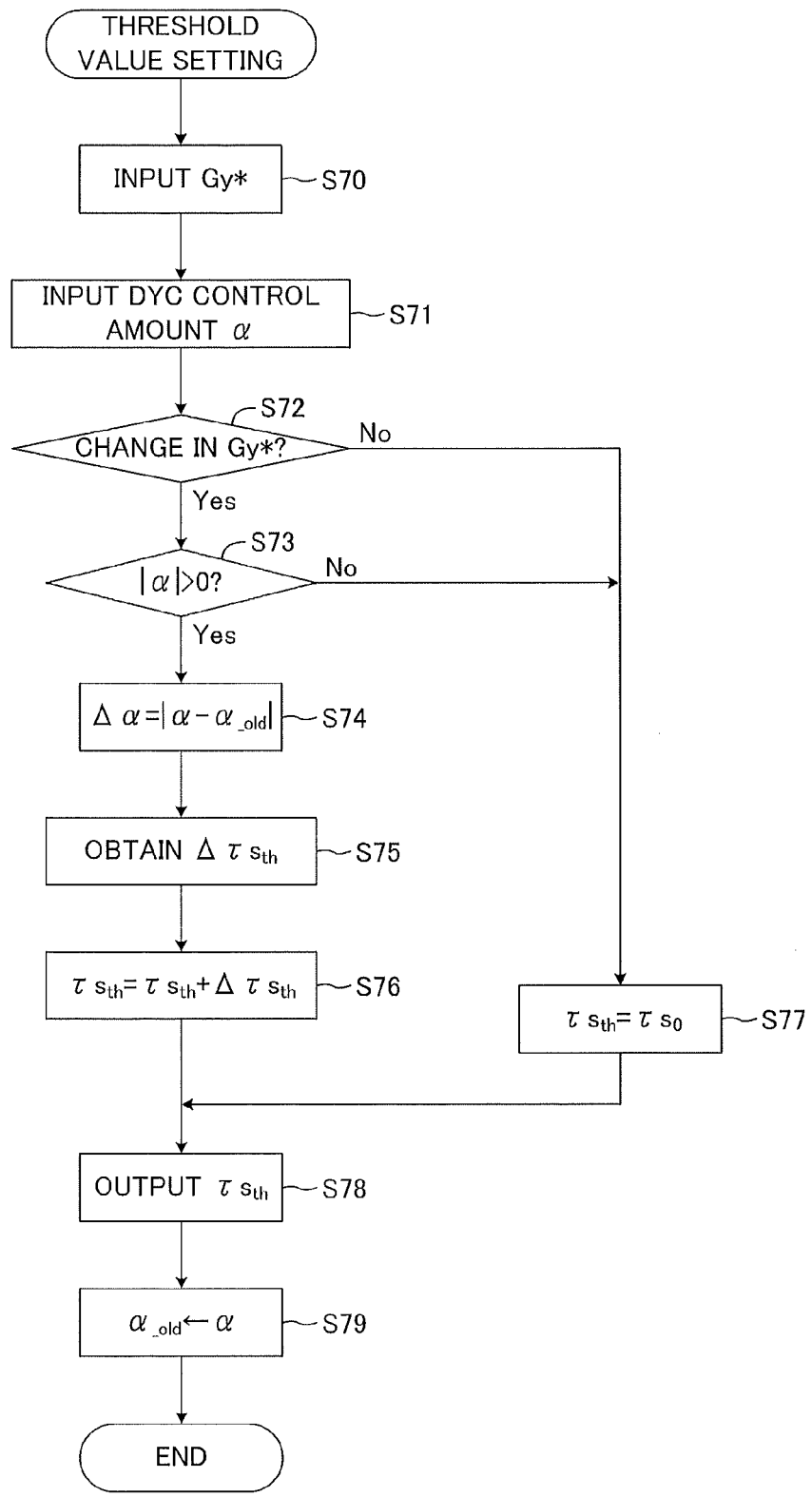
FIG. 22 is a flowchart illustrating a threshold value setting routine executed by a threshold value setting unit according to a fifth embodiment.

FIG. 22 is a flowchart illustrating a threshold value setting routine executed by the threshold value setting unit 417a in the present embodiment. This routine is executed repeatedly every predetermined short amount of time. When the routine is launched, the threshold value setting unit 417a firstly takes the target lateral acceleration Gy* as an input in S70. Next, a DYC control amount α is inputted. The DYC control amount α is, for example, the DYC yaw rate control amount $\gamma\_{DYC}$.

Next, the threshold value setting unit 417a calculates whether or not the target lateral acceleration Gy* has changed (S72). In the case where the target lateral acceleration Gy* has not changed (S72: No), the threshold value setting unit 417a advances to S77, where the threshold value $\text{TS}_{th}$ is set to the reference threshold value $\text{TS}_0$. However, in the case where the target lateral acceleration Gy* has changed (S72: Yes), the threshold value setting unit 417a advances to S73, where it is determined whether or not the DYC control amount a absolute value |α| is greater than 0, or in other words, whether or not the DYC actuator 32 is operating in order to carry out yaw rate control. In the case where the DYC control amount α is 0

(S73: No), or in other words, in the case where the DYC actuator 32 is not operating in order to carry out yaw rate control, the threshold value setting unit 417a advances to S77, where the threshold value $TS_{th}$ is set to the reference threshold value $TS_0$.

However, in the case where the DYC control amount a absolute value $|\alpha|$ is greater than 0 (S73: Yes), or in other words, in the case where the DYC actuator 32 is operating in order to carry out the yaw rate control, the threshold value setting unit 417a advances to S73, where a DYC control amount change amount $\Delta\alpha$ is calculated (S74). The DYC control amount change amount $\Delta\alpha$ is the absolute value of the difference between the DYC control amount a inputted in S71 at the current time this routine is executed and an old DYC control amount $\alpha_{\_old}$, which is the DYC control amount inputted in S71 at the previous time the routine was executed. Next, the threshold value setting unit 417a obtains the threshold value change amount $\Delta TS_{th}$ (S75). To obtain the threshold value change amount $\Delta TS_{th}$, a DYC control amount change amount-threshold value change amount table stored in the override determination unit 417 is referred to.

Figure 23:
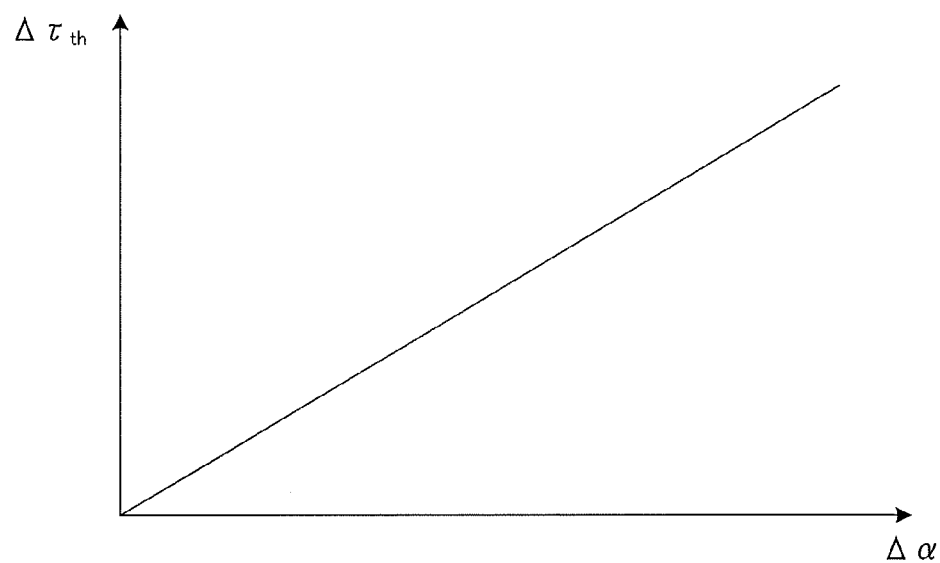
FIG. 23 is a diagram in which an example of a DYC control amount change amount-threshold value change amount table is represented as a graph.

FIG. 23 is a diagram in which an example of the DYC control amount change amount-threshold value change amount table is represented as a graph. In this graph, the horizontal axis represents the DYC control amount change amount $\Delta\alpha$, whereas the vertical axis indicates the threshold value change amount $\Delta TS_{th}$. As shown in FIG. 23, the threshold value change amount $\Delta TS_{th}$ is greater the greater the DYC control amount change amount $\Delta\alpha$ is. The threshold value setting unit 417a refers to this DYC control amount change amount-threshold value change amount table in S75, and obtains the threshold value change amount $\Delta TS_{th}$ corresponding to the DYC control amount change amount $\Delta\alpha$.

After the threshold value change amount $\Delta TS_{th}$ has been obtained in S75, the threshold value setting unit 417a sets a new threshold value $TS_{th}$ by adding the threshold value change amount $\Delta TS_{th}$ to the threshold value $TS_{th}$ that is currently set (S76).

After the threshold value $TS_{th}$ has been set in S76 or S77, the threshold value setting unit 417a advances to S78, where the set threshold value $TS_{th}$ is outputted. Next, the old DYC control amount $\alpha_{\_old}$ is updated by replacing the old DYC control amount $\alpha_{\_old}$ with the DYC control amount $\alpha$ inputted in S73 (S79). Thereafter, the routine ends. By setting the threshold value $TS_{th}$ in this manner, the threshold value $TS_{th}$ changes based on the DYC control amount change amount $\Delta\alpha$. Specifically, the threshold value $TS_{th}$ is set so that the change amount in the threshold value $TS_{th}$ increases as the change amount in the DYC control amount $\alpha$ increases.

Figure 24:
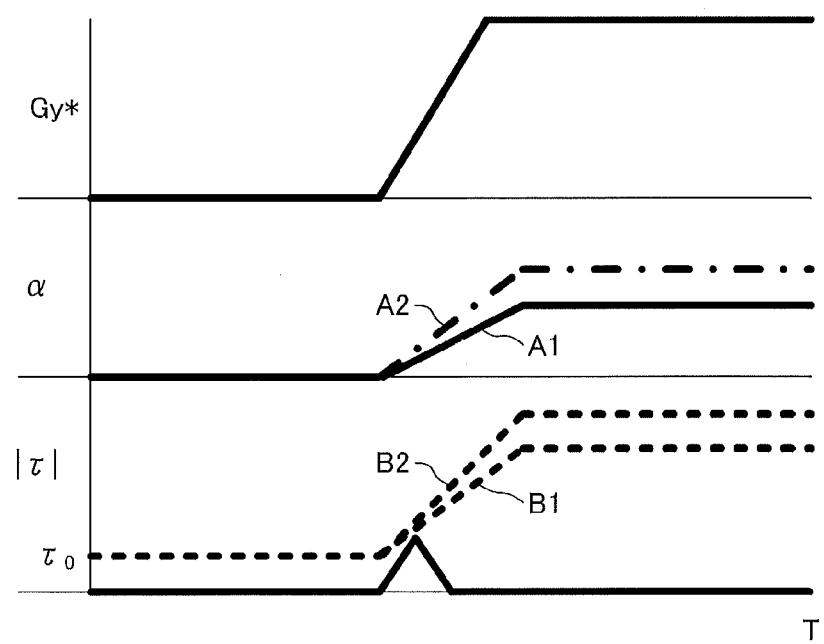
FIG. 24 is a graph illustrating a state of change over time in a target lateral acceleration Gy*, a DYC control amount α, and a steering torque absolute value |TS|, along with a threshold value $TS_{th}$ set using a method illustrated in the fifth embodiment.

FIG. 24 is a graph illustrating a state of change over time in the target lateral acceleration Gy* (or the target yaw rate γ*), the DYC control amount $\alpha$, and the steering torque absolute value |TS|, along with the threshold value $TS_{th}$ set using the method illustrated in the present embodiment. In FIG. 24, the horizontal axis represents time. In addition, in FIG. 24, the threshold value $TS_{th}$ to which the steering torque absolute value |TS| is compared is indicated by a dotted line.

As shown in FIG. 24, when the target lateral acceleration Gy* changes, the DYC control amount a also changes. Based on this DYC control amount $\alpha$, for example, a braking force is applied to one of the left and right wheels of the vehicle, and the yaw rate of the vehicle is controlled.

In the case where the yaw rate of the vehicle is controlled by the DYC actuator 32 operating, the turning state of the vehicle differs from a turning state resulting from the front wheels being steered, and thus there may be a case where the driver will feel a sense of discomfort in response to the turning operation and will hold onto the steering wheel. The magnitude of the steering torque increases as a result of the driver holding onto the steering wheel. When the magnitude (the absolute value) of the steering torque exceeds the threshold value $TS_{th}$, the yaw rate control is stopped. However, the steering torque TS that occurs temporarily due to a change in the DYC control amount $\alpha$ is not a steering torque inputted as a result of the driver steering with intent. Accordingly, it is preferable not to stop the yaw rate control in response to an increase in the steering torque when there is no intention to steer, as in this case.

With respect to this point, in the present embodiment, the threshold value $TS_{th}$ is changed based on the DYC control amount $\alpha$. Specifically, the threshold value $TS_{th}$ is changed in accordance with changes in the DYC control amount $\alpha$ so that the greater the DYC control amount change amount $\Delta\alpha$ is, the greater the threshold value change amount $\Delta TS_{th}$ added to the threshold value $TS_{th}$ is. Therefore, as shown in FIG. 24, when the DYC control amount a has changed in accordance with a change in the target lateral acceleration Gy*, the threshold value $TS_{th}$ increases. This make it possible to prevent or suppress such a case where the magnitude of the steering torque TS that does not result from intentional steering but is rather temporarily elicited due to a change in the DYC control amount a exceeds the threshold value $TS_{th}$. In other words, according to the lateral motion control apparatus 40 of the present embodiment, it is possible to accurately determine whether or not a driver is steering intentionally during lateral motion control.

Furthermore, the threshold value $TS_{th}$ is set so that the threshold value change amount $\Delta TS_{th}$ added to the threshold value $TS_{th}$ is greater the greater the DYC control amount change amount $\Delta\alpha$ is, and thus the slope of the temporal change in the threshold value $TS_{th}$ is greater the greater the temporal slope of the DYC control amount $\alpha$ is. For example, in the case where the DYC control amount a has gradually increased as illustrated by the solid line A1 in FIG. 24, the threshold value $TS_{th}$ also gradually increases as illustrated by the dotted line B1 in FIG. 24; likewise, in the case where the DYC control amount a has suddenly increased as illustrated by the dot-dash line A2 in FIG. 24, the threshold value $TS_{th}$ also suddenly increases as illustrated by the dotted line B2 in FIG. 24. The magnitude of the steering torque elicited in accordance with a change in the DYC control amount $\alpha$ is greater the greater the slope of the change in the DYC control amount $\alpha$ is. Accordingly, by setting the threshold value $TS_{th}$ so as to increase as the slope of the change in the DYC control amount a increases, it is possible to even more effectively prevent the steering torque magnitude |TS|, which has temporarily increased due to a change in the DYC control amount $\alpha$, from exceeding the threshold value $TS_{th}$.

(Sixth Embodiment)

Next, a sixth embodiment will be described. The above first embodiment describes an example in which when the magnitude of the steering torque TS has exceeded the threshold value $TS_{th}$, it is determined that the driver is steering intentionally, and the yaw rate control is stopped. On the other hand, the present embodiment describes an example in which when the time for which the magnitude of the steering torque TS exceeds the threshold value $TS_{th}$ has continued for larger than or equal to a predetermined amount of time, it is determined that the driver is steering intentionally, and the yaw rate control is stopped.

Figure 25:
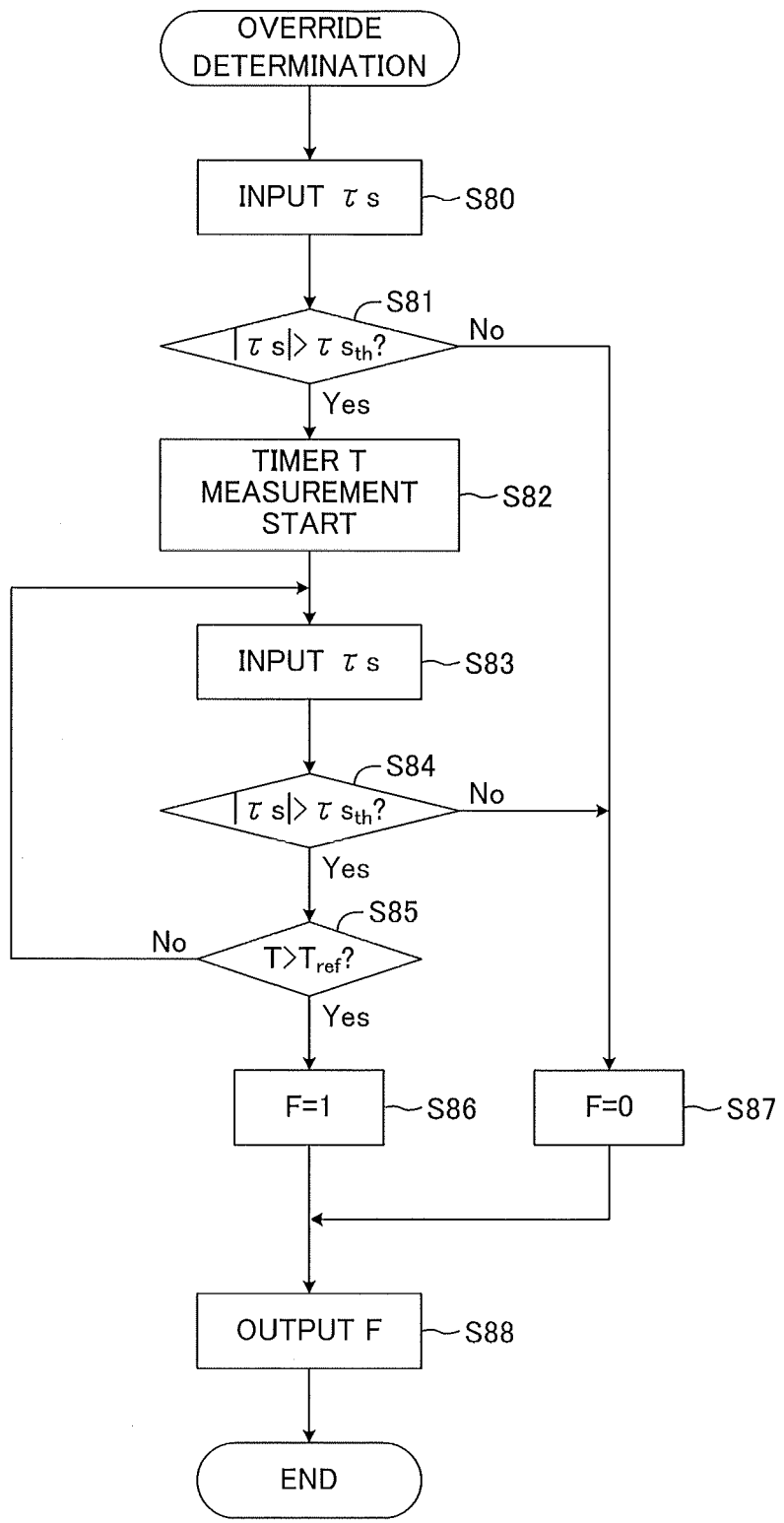
FIG. 25 is a flowchart illustrating an override determination routine executed by an override determination unit according to a sixth embodiment.

FIG. 25 is a flowchart illustrating an override determination routine executed by the comparison unit 417b in the present embodiment. This routine is executed repeatedly every predetermined short amount of time. When the routine is launched, firstly in S80 of FIG. 25, the comparison unit 417b takes the steering torque TS as its input. Next, it is determined whether or not the steering torque absolute value |TS| exceeds the threshold value $TS_{th}$ (S81). In the case where the steering torque absolute value |TS| does not exceed the threshold value $TS_{th}$ (S81: No), the comparison unit 417b determines that the steering is not intentional, advances to S87, and sets the override determination flag F to 0. The set override determination flag F is then outputted (S88). Thereafter, the routine ends.

Meanwhile, in the case where it has been determined in S81 that the steering torque magnitude |TS| exceeds the threshold value $TS_{th}$ (S81: Yes), the comparison unit 417b advances to S82, where a timer T commences measurement. Next, the steering torque TS is inputted (S83), and it is determined whether or not the steering torque absolute value |TS| exceeds the threshold value $TS_{th}$ (S84). In the case where the steering torque absolute value |TS| does not exceed the threshold value $TS_{th}$ at this point in time (S84: No), the comparison unit 417b determines that the steering is not intentional, advances to S87, and sets the override determination flag F to 0. The set override determination flag F is then outputted (S88). Thereafter, the routine ends.

When it has been determined in S84 that the steering torque absolute value |TS| exceeds the threshold value $TS_{th}$ (S84: Yes), the comparison unit 417b advances to S85, where it is determined whether or not the timer T has exceeded a reference time $T_{ref}$. In the case where the time measured by the timer T has not exceeded the reference time $T_{ref}$ (S85: No), the comparison unit 417b returns to S83, where the steering torque TS is once again inputted, and it is determined whether the inputted steering torque absolute value |TS| exceeds the threshold value $TS_{th}$ (S84). By repeating the processes from S83 to S85, the steering torque absolute value |TS| and the threshold value $TS_{th}$ are compared until the time measured by the timer T reaches the reference time $T_{ref}$. When it has been determined at least once that the steering torque absolute value |TS| does not exceed the threshold value $TS_{th}$, it is determined that the steering is not intentional, and the override determination flag F is set to 0.

In the case where it has been determined in S85 that the time measured by the timer T exceeds the reference time $T_{ref}$, the comparison unit 417b determines that the steering is intentional, and sets the override determination flag F to 1 (S86). The set override determination flag F (which is 1) is then outputted (S88). Thereafter, the routine ends. By carrying out such an override determination process, it is determined that the steering is intentional, and the override determination flag F is set to 1, in the case where the time for which the steering torque absolute value |TS| exceeds the threshold value $TS_{th}$ has continued for longer than or equal to the reference time $T_{ref}$. Meanwhile, in the case where the steering torque absolute value |TS| does not exceed the threshold value $TS_{th}$ and in the case where the time length for which the steering torque absolute value |TS| exceeds the threshold value $TS_{th}$ is shorter than the reference time $T_{ref}$, it is determined that the steering is not intentional, and the override determination flag F is set to 0.

Figure 26:
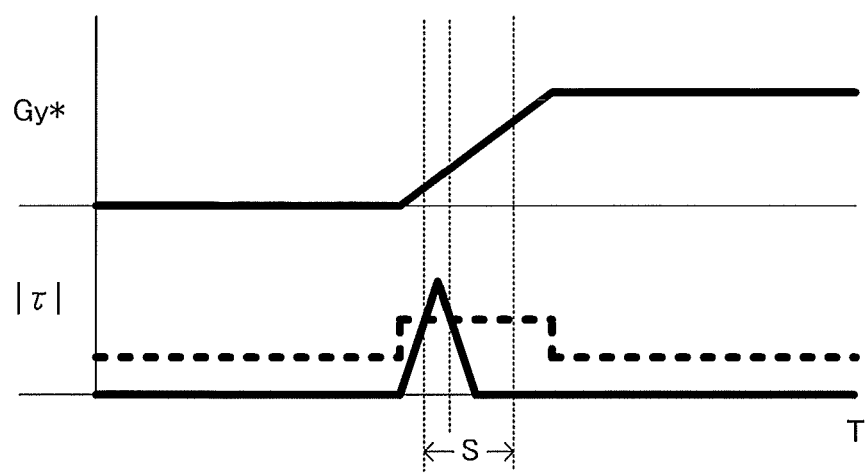
FIG. 26 is a graph illustrating a state of change over time in a target lateral acceleration Gy* and a steering torque absolute value |TS|, along with a constant threshold value $TS_{th}$.
Figure 27:
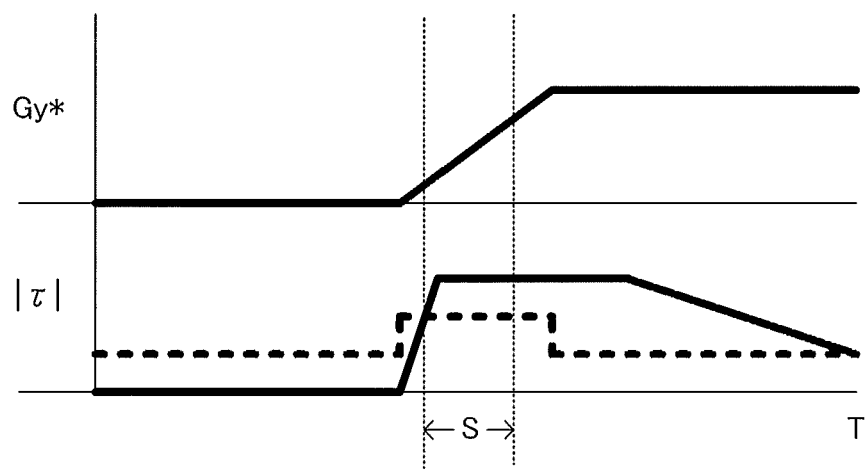
FIG. 27 is a graph illustrating a state of change over time in a target lateral acceleration Gy* and a steering torque absolute value |TS|, along with a constant threshold value $TS_{th}$.

FIGS. 26 and 27 are graphs illustrating states of change over time in the target lateral acceleration Gy* (or the target yaw rate γ*) and the steering torque absolute value |TS|, along with the threshold value $TS_{th}$. In FIGS. 26 and 27, the horizontal axis represents time. In addition, the threshold value $TS_{th}$ to which the absolute value |TS| of the steering torque TS is compared is indicated by a dotted line. Furthermore, the period indicated by the S in FIGS. 26 and 27 is the reference time $T_{ref}$. As shown in FIGS. 26 and 27, when the target lateral acceleration Gy* has changed, the magnitude of the steering torque (the absolute value) changes (increases). Likewise, the threshold value $TS_{th}$ changes (increases) in accordance with the change in the target lateral acceleration Gy*.

In the case shown in FIG. 26, the time length for which the threshold value $TS_{th}$ exceeds the steering torque absolute value |TS| is less than the reference time $T_{ref}$. In this case, the override determination flag is set to 0, and thus the yaw rate control is continued. However, in the case shown in FIG. 27, the time length for which the threshold value $TS_{th}$ exceeds the steering torque absolute value |TS| exceeds the reference time $T_{ref}$. In this case, the override determination flag is set to 1, and thus the yaw rate control is stopped.

Even in the case where the threshold value $TS_{th}$ has been increased in accordance with a change in the target lateral acceleration Gy*, there may be a case where the magnitude of the steering torque resulting from steering that is not intentional exceeds the threshold value, depending on the conditions of the input of the steering torque by the driver. Even in such a case, according to the present embodiment, the yaw rate control is not stopped as long as the time length for which the steering torque absolute value |TS| exceeds the threshold value is shorter than the reference time $T_{ref}$, and it is therefore possible to more effectively prevent the yaw rate control from being stopped due to steering torque resulting from unintentional steering. Meanwhile, the time length for which the steering torque absolute value |TS| exceeds the threshold value $TS_{th}$ is longer than or equal to the reference time $T_{ref}$, it is extremely likely that the driver has stopped the yaw rate control and is steering in accordance with his or her own intentions. In such a case, by stopping the yaw rate control as described in the present embodiment, it is possible to provide a more useful lateral motion control apparatus that takes into consideration intentional steering on the part of the driver.

Exemplary embodiments have been described thus far. According to these embodiments, a lateral motion control apparatus for a vehicle (40) includes a target value obtaining unit (411) that obtains a target value (γ* or Gy*) for a lateral motion amount of a vehicle, a control amount calculation unit (414, 415, 416) that calculates a control amount for a control object (14, 22, 32) controlled so as to change the lateral motion amount of the vehicle based on the target value of the lateral motion amount obtained by the target value obtaining unit, a steering intent determination unit (417) that determines whether or not a driver of the vehicle is steering with intent, and a control object control unit (42, 43, 44) that controls the control object so as to control the control object based on the control amount when the steering intent determination unit has not determined that the driver is steering with intent, and to stop the control of the control object when the steering intent determination unit has determined that the driver is steering with intent. The steering intent determination unit includes a steering operation amount obtaining unit (S20, S80) that obtains the steering operation amount inputted by the driver of the vehicle, and a threshold value setting unit (417a) that sets a threshold value for the steering operation amount based on the target value. Then, the steering intent determination unit determines whether or not the driver is steering with intent by comparing the magnitude of the steering operation amount inputted by the driver of the vehicle with the threshold value set by the threshold value setting unit.

Further, the steering intent determination unit determines that the driver is steering with intent when the magnitude of the steering operation amount obtained by the steering operation amount obtaining unit is greater than the threshold value set by the threshold value setting unit.

According to the embodiments, the steering intent determination unit compares the steering operation amount inputted by the driver of the vehicle with a threshold value set for that steering operation amount. The steering intent determination unit then determines whether or not the driver is steering with intent based on the result of that comparison. The threshold value used at this time is set by the threshold value setting unit. The threshold value setting unit sets the threshold value based on the target value for the lateral motion amount of the vehicle.

The lateral motion control apparatus for a vehicle controls the lateral motion of the vehicle by controlling a control object such as an actuator based on a target value for the lateral motion amount obtained from, for example, a request signal outputted from a driving assistance application. The setting state of this target value (the magnitude, direction, change, change amount, and so on of the target value) is influenced by whether or not the steering operation amount inputted by the driver was inputted as a result of intentional steering. For example, when the target value changes, it is highly likely that the steering operation amount has been inputted unrelated to intent to steer. Likewise, in the case where the set direction of the target value differs from the direction of the steering operation amount inputted by the driver, it is highly likely that that steering operation amount has been inputted by the driver steering intentionally. Accordingly, it is possible to accurately determine whether or not the driver is steering intentionally by comparing the threshold value set based on the target value for the lateral motion amount with the steering operation amount.

In the disclosure, the "steering operation amount" indicates an amount by which the vehicle has been steered by the driver of the vehicle. The "steering operation amount" is, for example, a steering torque inputted by the driver of the vehicle through the steering wheel. The steering angle of the steering wheel, the steering angular speed, the turning angle of the front wheels, and the turning angular speed also correspond to "steering operation amounts". Among these, it is preferable for the steering torque to be used as the steering operation amount.

It is preferable for the threshold value setting unit to set the threshold value so that the threshold value set when the target value has changed is greater than the threshold value set when the target value has not changed. When the target value has changed, it is highly likely that the steering operation amount has been inputted unrelated to whether or not there is intent to steer. In the present disclosure, the threshold value set when the target value changes is set to a high value, and thus the magnitude of the steering operation amount inputted without intent to steer less likely exceeds the threshold value when the target value changes. Accordingly, it is possible to accurately determine whether or not there is intent to steer by comparing the threshold value set in this manner with the magnitude of the steering operation amount inputted by the driver.

Furthermore, it is preferable for the threshold value setting unit to set the threshold value so that the threshold value is greater the greater a change amount in the target value is. The steering operation amount elicited unrelated to the intent to steer when the target value has changed is greater the greater the change amount in the target value is. Accordingly, the threshold value is set so that the threshold value is greater the greater the change amount in the target value is, and thus it can be accurately determined whether or not there is intent to steer by comparing the threshold value set in this manner with the magnitude of the steering operation amount inputted by the driver.

Furthermore, it is preferable for the threshold value setting unit to set the threshold value so that a change amount in the threshold value is greater the greater a change amount in the target value is. The change amount in the steering operation amount elicited unrelated to the intent to steer when the target value has changed is greater the greater the change amount in the target value is. Accordingly, the threshold value is set so that the change amount in the threshold value is greater the greater the change amount in the target value is, and thus it can be accurately determined whether or not there is intent to steer by comparing the threshold value set in this manner with the magnitude of the steering operation amount inputted by the driver.

Furthermore, it is preferable for the threshold value setting unit to set the threshold value based on the direction of the lateral motion of the vehicle represented by the target value and the direction of the lateral motion of the vehicle elicited by a steering operation performed by the driver of the vehicle. Here, in the case where the direction of the lateral motion of the vehicle represented by the target value and the direction of the lateral motion of the vehicle elicited by a steering operation performed by the driver of the vehicle are different, it is preferable for the threshold value setting unit to set the threshold value to a value that is lower than the threshold value set in the case where the direction of the lateral motion of the vehicle represented by the target value and the direction of the lateral motion of the vehicle elicited by a steering operation performed by the driver of the vehicle are the same.

In the case where the direction of the lateral motion of the vehicle (for example, the right turning direction or the left turning direction) represented by the target value (for example, a target yaw rate or a target lateral acceleration) differs from the direction of the lateral motion of the vehicle (for example, the right turning direction or the left turning direction) elicited by a steering operation performed by the driver of the vehicle, it is highly likely that the driver has performed the steering operation intentionally. The threshold value is thus set to be low in the case where the direction of the lateral motion of the vehicle represented by the target value and the direction of the lateral motion of the vehicle elicited by a steering operation performed by the driver are different, and it is possible to accurately determine whether or not there is intent to steer by comparing the threshold value set in this manner with the magnitude of the steering operation amount inputted by the driver.

Furthermore, in the case where the direction of the lateral motion of the vehicle represented by the target value and the direction of the lateral motion of the vehicle elicited by a steering operation performed by the driver of the vehicle are different, it is preferable for the threshold value setting unit to set the threshold value so that the change amount in the threshold value is greater the greater the change amount in the steering operation amount of the steering operation is. In the case where the direction of the lateral motion of the vehicle represented by the target value is different from the direction of the lateral motion of the vehicle elicited by a steering operation performed by the driver, the greater the change amount in the steering operation amount performed by the driver is, the more likely it is that the driver has performed the steering operation intentionally. Accordingly, by setting the threshold value so that the change amount in the threshold value is greater the greater the change amount in the steering operation amount is (in other words, by reducing the threshold value more quickly), it is possible to further advance the time at which it is determined that there is intent to steer in the case where the driver has performed the steering operation with intent.

Furthermore, it is preferable for the control object to include a DYC actuator (32) that applies a braking force or a driving force to vehicle wheels and a rear steering actuator (22) that steers rear wheels. Here, it is preferable for the threshold value setting unit to set the threshold value based on control amounts of the DYC actuator and the rear steering actuator when the target value has changed. In this case, it is preferable for the threshold value setting unit to set the threshold value so that the threshold value is greater the greater the control amounts of the DYC actuator and the rear steering actuator are. In particular, it is preferable for the threshold value setting unit to set the threshold value so that the change amount in the threshold value is greater the greater the change amounts in the control amounts of the DYC actuator and the rear steering actuator are.

In the above, the DYC (Dynamic Yaw Control) actuator refers to an actuator that can impart a braking force or a driving force on the individual vehicle wheels. For example, a braking actuator that imparts a braking force on the individual vehicle wheels, a motor that imparts a driving force or a regenerative braking force on the individual vehicle wheels (such as an in-wheel motor or the like), and so on correspond to DYC actuators. Meanwhile, the rear steering actuator refers to an actuator that is capable of steering the rear wheels.

In the case where the DYC actuator and the rear steering actuator have operated in accordance with a target value for the lateral motion amount, the turning state of the vehicle differs from the normal turning state (a turn that occurs due to the front wheels being steered). Accordingly, there is a tendency for the driver to feel a sense of discomfort and hold onto the steering wheel as a result. As a result of the driver holding onto the steering wheel, the steering operation amount unrelated to the driver's intent to steer increases. With respect to this point, in the above-mentioned disclosure, the threshold value is set based on the control amounts of the DYC actuator and the rear steering actuator. For example, the threshold value is set so that the threshold value is greater the greater the control amounts for the DYC actuator and the rear steering actuator are, or so that the change amount in the threshold value is greater the greater the change amounts in the control amounts of the DYC actuator and the rear steering actuator are (that is, so that the threshold value increases more quickly). Accordingly, the threshold value for a steering operation amount unrelated to the intent to steer elicited as a result of the DYC actuator and the rear steering actuator operating is set higher. It is thus possible to accurately determine whether or not there is intent to steer by comparing the threshold value set in this manner with the magnitude of the steering operation amount inputted by the driver.

In addition, it is preferable for the steering intent determination unit to determine that the driver is steering with intent when the time for which the magnitude of the steering operation amount obtained by the steering operation amount obtaining unit is greater than the threshold value set by the threshold value setting unit continues for greater than or equal to a predetermined amount of time. In this case, it is determined that the driver is steering with intent only when the time for which the magnitude of the steering operation amount exceeds the threshold value has continued for greater than or equal to a predetermined amount of time. It is thus possible to stop the lateral motion control only in the case where it is more certain that there is intent to steer.

Although the foregoing has described embodiments, the present invention is not limited to the aforementioned embodiments in any way. For example, although the aforementioned embodiments describe examples in which the steering torque TS is compared to the threshold value $TS_{th}$, a steering operation amount aside from the steering torque TS can be used as long as it is a steering operation amount that can reflect intentional steering. Furthermore, although the above third and fourth embodiments describe examples in which the direction of the target yaw rate and the direction of the yaw rate elicited by steering torque are compared, the target yaw rate may be compared to a steering operation amount aside from the steering torque as long as that steering operation amount reflects intentional steering. For example, in the case where the rear steering actuator is used in the yaw rate control, the direction of the target yaw rate may be compared with the direction of the yaw rate represented by the steering angle (or the steering angular speed). In addition, although the aforementioned embodiments describe examples in which the threshold value $TS_{th}$ is set based on the target lateral acceleration Gy*, the target yaw rate γ* may be used instead of the target lateral acceleration Gy*, and the threshold value $TS_{th}$ may be set based on the target yaw rate γ*. Furthermore, although the DYC actuator is an actuator that imparts a braking force on the vehicle wheels (that is, is a braking actuator) in the aforementioned embodiments, the DYC actuator may be an actuator that imparts a driving force on the vehicle wheels. In this manner, the present invention may be varied as long as such variations do not depart from the scope of the present invention.

The invention claimed is:

1. A lateral motion control apparatus for a vehicle comprising:
 a target value obtaining unit that obtains a target value for a lateral motion amount of a vehicle;
 a control amount calculation unit that calculates a control amount for a control object controlled so as to change the lateral motion amount of the vehicle based on the target value of the lateral motion amount obtained by the target value obtaining unit;
 a steering intent determination unit that determines whether or not a driver of the vehicle is steering with intent; and
 a control object control unit that controls the control object so as to control the control object based on the control amount when the steering intent determination unit has not determined that the driver is steering with intent, and to stop the control of the control object when the steering intent determination unit has determined that the driver is steering with intent;
 wherein the steering intent determination unit includes a steering operation amount obtaining unit that obtains the steering operation amount inputted by the driver of the vehicle and a threshold value setting unit that sets a threshold value for the steering operation amount based on the target value, and the steering intent determination unit determines whether or not the driver is steering with intent by comparing the magnitude of the steering operation amount inputted by the driver of the vehicle with the threshold value set by the threshold value setting unit.

2. The lateral motion control apparatus for a vehicle according to claim 1,
 wherein the determination unit determines that the driver is steering with intent when the magnitude of the steering operation amount obtained by the steering operation amount obtaining unit is greater than the threshold value set by the threshold value setting unit.

3. The lateral motion control apparatus for a vehicle according to claim 1,
 wherein the threshold value setting unit sets the threshold value so that the threshold value set when the target value has changed is greater than the threshold value set when the target value has not changed.

4. The lateral motion control apparatus for a vehicle according to claim 1,
wherein the threshold value setting unit sets the threshold value so that the threshold value is greater the greater a change amount in the target value is.

5. The lateral motion control apparatus for a vehicle according to claim 1,
wherein the threshold value setting unit sets the threshold value so that a change amount in the threshold value is greater the greater a change amount in the target value is.

6. The lateral motion control apparatus for a vehicle according to claim 1,
wherein the threshold value setting unit sets the threshold value based on the direction of the lateral motion of the vehicle represented by the target value and the direction of the lateral motion of the vehicle elicited by a steering operation performed by the driver of the vehicle.

7. The lateral motion control apparatus for a vehicle according to claim 6,
wherein in the case where the direction of the lateral motion of the vehicle represented by the target value and the direction of the lateral motion of the vehicle elicited by a steering operation performed by the driver of the vehicle are different, the threshold value setting unit sets the threshold value to a value that is lower than the threshold value set in the case where the direction of the lateral motion of the vehicle represented by the target value and the direction of the lateral motion of the vehicle elicited by a steering operation performed by the driver of the vehicle are the same.

8. The lateral motion control apparatus for a vehicle according to claim 6,
wherein in the case where the direction of the lateral motion of the vehicle represented by the target value and the direction of the lateral motion of the vehicle elicited by a steering operation performed by the driver of the vehicle are different, the threshold value setting unit sets the threshold value so that the change amount in the threshold value is greater the greater the change amount in the steering operation amount of the steering operation is.

9. The lateral motion control apparatus for a vehicle according to claim 1,
wherein the control object includes a DYC actuator that applies any of a braking force and a driving force to vehicle wheels and a rear steering actuator that steers rear wheels; and
the threshold value setting unit sets the threshold value based on control amounts of the DYC actuator and the rear steering actuator.

10. The lateral motion control apparatus for a vehicle according to claim 1,
wherein the steering intent determination unit determines that the driver is steering with intent when the time for which the magnitude of the steering operation amount obtained by the steering operation amount obtaining unit is greater than the threshold value set by the threshold value setting unit continues for greater than or equal to a predetermined amount of time.

\* \* \* \* \*